US010924707B2

(12) United States Patent
Zhou et al.

(10) Patent No.: US 10,924,707 B2
(45) Date of Patent: Feb. 16, 2021

(54) INSTANT VIDEO COMMUNICATION CONNECTIONS

(71) Applicant: Apple Inc., Cupertino, CA (US)

(72) Inventors: Xiaosong Zhou, Campbell, CA (US); Hsi-Jung Wu, San Jose, CA (US); Chris Y. Chung, Sunnyvale, CA (US); James Normile, Los Altos, CA (US); Joe S. Abuan, Cupertino, CA (US); Hyeonkuk Jeong, Saratoga, CA (US); Yan Yang, San Jose, CA (US); Gobind Johar, San Jose, CA (US); Thomas Christopher Jansen, San Francisco, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/112,540

(22) Filed: Aug. 24, 2018

(65) Prior Publication Data

US 2019/0058846 A1    Feb. 21, 2019

Related U.S. Application Data

(63) Continuation of application No. 15/368,371, filed on Dec. 2, 2016, now Pat. No. 10,063,810, which is a
(Continued)

(51) Int. Cl.
*H04N 7/14* (2006.01)
*H04L 29/06* (2006.01)
(Continued)

(52) U.S. Cl.
CPC .......... *H04N 7/147* (2013.01); *H04L 51/04* (2013.01); *H04L 51/10* (2013.01); *H04L 65/1069* (2013.01); *H04N 7/15* (2013.01)

(58) Field of Classification Search
USPC ...................................... 348/14.01
See application file for complete search history.

(56) References Cited

U.S. PATENT DOCUMENTS

| 6,724,915 B1 | 4/2004 | Toklu et al. |
| 7,536,707 B2 | 5/2009 | Matsumoto et al. |
(Continued)

FOREIGN PATENT DOCUMENTS

| JP | 2010124426 | 6/2010 |
| KR | 20020077449 | 10/2002 |
(Continued)

OTHER PUBLICATIONS

Office Action from Chinese Application No. 201580026580.4, (Apple Inc.), dated Nov. 22, 2018, pp. 1-11.
(Continued)

*Primary Examiner* — Maria El-Zoobi
(74) *Attorney, Agent, or Firm* — Fish & Richardson P.C.

(57) ABSTRACT

Computing devices may implement instant video communication connections for video communications. Connection information for mobile computing devices may be maintained. A request to initiate an instant video communication may be received, and if authorized, the connection information for the particular recipient mobile computing device may be accessed. Video communication data may then be sent to the recipient mobile computing device according to the connection information so that the video communication data may be displayed at the recipient device as it is received. New connection information for different mobile computing devices may be added, or updates to existing connection information may also be performed. Connection information for some mobile computing devices may be removed.

20 Claims, 24 Drawing Sheets

Related U.S. Application Data continuation of application No. 14/296,356, filed on Jun. 4, 2014, now Pat. No. 9,516,269.

(51) Int. Cl.
*H04N 7/15* (2006.01)
*H04L 12/58* (2006.01)

(56) References Cited

U.S. PATENT DOCUMENTS

| | | |
|---|---|---|
| 7,984,098 B2 | 7/2011 | Enete et al. |
| 8,077,702 B2 | 12/2011 | Blomkvist |
| 8,108,541 B2 | 1/2012 | Shamilian et al. |
| 8,340,651 B1 | 12/2012 | Gailloux et al. |
| 8,467,815 B2 | 6/2013 | Collet et al. |
| 8,553,864 B2 | 10/2013 | Chattedee |
| 8,558,870 B2 | 10/2013 | Lee |
| 8,576,325 B2 | 11/2013 | Dudek et al. |
| 8,619,116 B2 | 12/2013 | Pennington |
| 8,738,072 B1 | 5/2014 | Messerian |
| 8,831,191 B1 | 9/2014 | Vendrow |
| 9,014,661 B2 | 4/2015 | deCharms |
| 9,232,187 B2 | 1/2016 | Zhou et al. |
| 9,232,188 B2 | 1/2016 | Zhou et al. |
| 9,516,269 B2 | 12/2016 | Zhou et al. |
| 9,544,540 B2 | 1/2017 | Zhou et al. |
| 10,063,810 B2 | 8/2018 | Zhou et al. |
| 2002/0075407 A1 | 6/2002 | Cohen-Solal |
| 2003/0208543 A1 | 11/2003 | Enete et al. |
| 2005/0166242 A1 | 7/2005 | Matsumoto et al. |
| 2005/0177837 A1 | 8/2005 | Mensah et al. |
| 2006/0126932 A1 | 6/2006 | Eschbach |
| 2006/0256959 A1 | 11/2006 | Hymes |
| 2006/0279628 A1 | 12/2006 | Fleming |
| 2007/0104191 A1 | 5/2007 | Jeon et al. |
| 2008/0034038 A1 | 2/2008 | Ciudad et al. |
| 2008/0117821 A1 | 5/2008 | Asati et al. |
| 2008/0273077 A1 | 11/2008 | Cowherd |
| 2009/0029676 A1 | 1/2009 | Thalapaneni et al. |
| 2009/0046075 A1* | 2/2009 | Kim .............. G06F 3/0488 345/173 |
| 2009/0092234 A1 | 4/2009 | St Onge et al. |
| 2010/0077039 A1 | 3/2010 | Collet et al. |
| 2010/0185729 A1 | 7/2010 | Lord et al. |
| 2011/0119392 A1 | 5/2011 | Shamilian et al. |
| 2011/0148934 A1 | 6/2011 | Nurmi |
| 2011/0282697 A1 | 11/2011 | Fitzgerald |
| 2012/0092438 A1 | 4/2012 | Guzman Suarez et al. |
| 2012/0098920 A1 | 4/2012 | Pennington et al. |
| 2012/0244940 A1 | 9/2012 | Solomon et al. |
| 2012/0249877 A1 | 10/2012 | Hernandez Costa et al. |
| 2012/0274728 A1* | 11/2012 | Yasoshima .............. H04N 7/15 348/14.07 |
| 2013/0027504 A1 | 1/2013 | Zhang et al. |
| 2013/0093828 A1 | 4/2013 | Enete et al. |
| 2013/0111052 A1 | 5/2013 | Albal et al. |
| 2013/0127908 A1 | 5/2013 | Soundararajan |
| 2013/0145248 A1 | 6/2013 | Friedlander et al. |
| 2013/0145267 A1 | 6/2013 | Ramachandran |
| 2013/0263021 A1 | 10/2013 | Dunn et al. |
| 2013/0332832 A1 | 12/2013 | Lin |
| 2014/0101554 A1 | 4/2014 | Morris |
| 2014/0111596 A1 | 4/2014 | Grevers, Jr. |
| 2014/0184723 A1* | 7/2014 | Morrison .............. H04N 7/147 348/14.07 |
| 2014/0200929 A1 | 7/2014 | Fitzgerald et al. |
| 2014/0219188 A1 | 8/2014 | Bertin et al. |
| 2014/0267540 A1 | 9/2014 | Torgersrud |
| 2014/0317532 A1 | 10/2014 | Ma |
| 2014/0368601 A1 | 12/2014 | deCharms |
| 2015/0029295 A1 | 1/2015 | Gupta et al. |
| 2015/0065104 A1 | 3/2015 | White |
| 2015/0208211 A1 | 7/2015 | Guo et al. |
| 2015/0220141 A1 | 8/2015 | Shows |
| 2015/0358577 A1 | 12/2015 | Zhou et al. |
| 2015/0358580 A1 | 12/2015 | Zhou et al. |
| 2015/0358581 A1 | 12/2015 | Zhou et al. |
| 2015/0358582 A1 | 12/2015 | Zhou et al. |
| 2016/0034710 A1 | 2/2016 | McReynolds et al. |
| 2016/0191842 A1 | 6/2016 | Lee et al. |
| 2017/0039867 A1* | 2/2017 | Fieldman .......... H04N 21/47205 |
| 2017/0064195 A1 | 3/2017 | Coddington |
| 2017/0078754 A1 | 3/2017 | O'Hanlon |
| 2017/0085836 A1 | 3/2017 | Zhou et al. |
| 2017/0104729 A1 | 4/2017 | Danzeisen et al. |
| 2017/0244828 A1 | 8/2017 | Chan et al. |

FOREIGN PATENT DOCUMENTS

| | | |
|---|---|---|
| KR | 20080103813 | 11/2008 |
| KR | 20090002699 | 1/2009 |
| KR | 10-2014-0030850 | 3/2014 |
| KR | 20140030850 | 3/2014 |

OTHER PUBLICATIONS

U.S. Appl. No. 14/296,348, filed Jun. 4, 2014, Xiaosong Zhou et al.
U.S. Appl. No. 14/296,349, filed Jun. 4, 2014, Xiaosong Zhou et al.
U.S. Appl. No. 14/296,354, filed Jun. 4, 2014, Xiaosong Zhou et al.
International Search Report and Written Opinion in PCT/US2015/032938, dated Jul. 31, 2015, Apple Inc., pp. 1-12.
Mindy Kingswood, "How to use Picture-in-Picture on Skype for Android Tablets (PiP Skype)", Feb. 18, 2014, Retrived from the Internet: URL http://www.supertintin.com/blog/how-to-record-skype/use-picture-picture-skype-android-tablets-pip-skype, pp. 1-2.
Notice of Preliminary Rejection from Korean Application No. 10-2016-7032739, dated Apr. 14, 2017, Apple Inc., pp. 1-5.
Office Action from Korean Application No. 10-2019-7015702, (English Translation and Korean Version), Apple Inc., dated Aug. 16, 2019, pp. 1-15.
PCT International Preliminary Report on Patentability in International Appln. No. PCT/US2015/032938, dated Dec. 6, 2016, 7 pages.
EP Extended European Search Report and Written Opinion in European Appln. No. 20187921.0, dated Oct. 9, 2020, 11 pages.

* cited by examiner participant device display 232

INSTANT VIDEO COMMUNICATION CONNECTIONS

This application is a continuation of U.S. patent application Ser. No. 15/368,371, filed Dec. 2, 2016, now U.S. Pat. No. 10,063,810, which is a continuation of U.S. patent application Ser. No. 14/296,356, filed Jun. 4, 2014, now U.S. Pat. No. 9,516,269, which are hereby incorporated by reference herein in their entirety.

BACKGROUND

The advent of mobile computing combined with more powerful networking capabilities has changed the ways in which individuals communicate. Formerly, specialized networks had to be configured with particular equipment to provide different types of communication. Video conferencing, for instance, relied upon specialized telephone networks, radio frequencies, or closed-circuit television systems to provide two-way or multi-way video communications between users at different (and often fixed) locations. As broadband or other high-capacity networking technologies have allowed greater and more flexible access to a variety of different systems or devices, via the Internet for instance, different types of communication have developed or evolved to take advantage of these more powerful networking capabilities. For example, instant messaging technologies may provide real-time transmission of text messages over the Internet, allowing participants to chat between two Internet-enabled devices.

Video conferencing has also evolved to facilitate video communication between network-connected devices. Video communication data may be transmitted over networks, such as the Internet, to other participants, providing a video conference-like user experience, without being subject to the limitations of older and more static communication technologies. However, as many devices, such as laptops, mobile phones, tablet computers, or other mobile computing devices now facilitate multiple programs or functions operating simultaneously, video communications may be subject to disruption, inattention, or competition for computing resources of the device performing video communication, dulling the reach or effectiveness of new video communication technologies.

SUMMARY

Various embodiments of dynamically displayed video communication data are described herein. Video communications between two or more participants may be facilitated based on the transmission of video communication data between the participants. However, other applications may be currently executing at one or more of the participants that may be controlling or displaying image data or video data on an electronic display. Video communication data received as part of the video communication may then be displayed within a portion of electronic display as may be configured by the currently executing application. The currently executing application may configure one or more display attributes at runtime which indicate the display location for video communication data. In some embodiments, the video communication data may be blended into other image or video data of the currently executing application to produce a single video stream to be displayed. Various inputs may be received for the video communication, such as pausing, resuming, or ending the video communication, via touch input in the display location of the video communication data.

BRIEF DESCRIPTION OF THE DRAWINGS

FIGS. 5-6C illustrate dynamically displayed video communication data in an electronic display of a participant device, according to some embodiments.

Figure 1B:
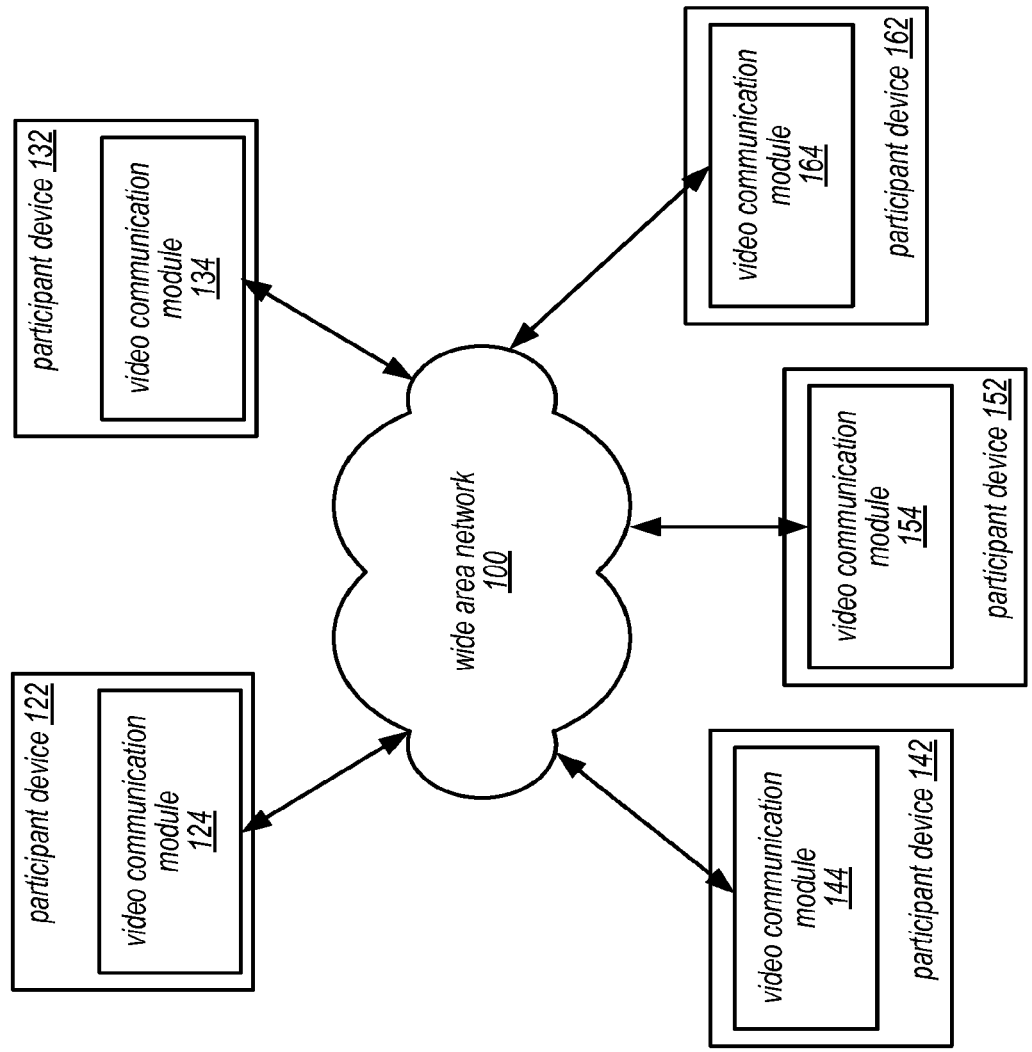
FIGS. 1A and 1B illustrate peer-managed video communications between different participants, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of dynamic display of video communications are described herein. Video communications may occur between different participant devices. These participant devices may capture video and audio data (usually of a user) at the respective participant device and transmit the collective video communication data to other participants in the video communication for display. While video communication data may be displayed under the control of a video communication application, for example in a full-screen display mode, other applications may be concurrently executing at participant devices. These applications may control or utilize some or all of the display for image data or other graphics for the application. Dynamic display of video communications may allow for the currently executing applications to control, direct, or otherwise configure where the video communication data received for the video communication is displayed at the participant device.

Various embodiments of dynamic pause and resume for video communications are described herein. As noted above, other applications or tasks may be executing at a participant device in a video communication. At times, therefore, the level of participation or active exchange of information via the video communication may fluctuate. Evaluation of the communication data that is captured for the video communication may indicate whether transmission of some or none of the video communication data is necessary. Dynamic pause and resume for video communications may provide an automated or intelligent detection of pause events, where active transmission of some or all of the video communication data may be paused without prohibiting the exchange of information via the video communication among active participants. Similarly, an automated or intelligent detection of resume events may allow for the suspended transmission of video communication data to resume. Computing resources at the participant device may therefore be dynamically conserved.

Various embodiments of dynamic transitions from video messages to video communications are described herein. Video messaging is used to send videos to recipient devices that may be played back at the convenience of the recipient. Exchanging information in this manner may be less efficient for a user than multi-directional communication, such as video communication. Dynamic transitions from video messages may be implemented such that if a user of a recipient device receives a video message and wishes to respond or engage in further communication, a video communication may be established instead of replying with another video message. In this way a user may respond to the video message with more flexibility, either a video communication may be established, or the video message may be saved for later play back and/or response.

Various embodiments of instant video communication connections are described herein. For communications between certain users, it may be desirable to prefer video communication over other communication technologies, such as voice or text. Family members, friends, co-workers, or other communicative relationships may take advantage of quick and efficient video communications. Instant video communications may allow users to authorize pre-established video communication connections between respective participant devices, so that video communications may appear to begin instantly. For instance, a video communication may be displayed as soon as it is received, minimizing the time to prior to engaging in video communication. Users may manage or authorize which other users (or their respective participant devices) may establish instant video communications with their own respective participant device.

Video communications may occur between two or more participant devices over a wide area network. Participant devices may implement some kind of application, module, or component that may facilitate video communications, from establishing connections, to capturing, transmitting, and processing received video communication data. Different types of participant devices may establish or participate in video communications, as well as different numbers of participants, such as two-way or multi-way video communications. In various embodiments, video communications may be peer coordinated or managed. For example, participant devices engaged in a video communication may utilize peer-to-peer communication strategies or protocols in order transmit and receive communication data. Please note, that peer-managed video communications may not preclude the use of third-party systems or services to facilitate portions of the video communication, such as cellular or other types of wireless network services that may provide access to a wide area network for participant devices, authentication or identification services, or simply relay or retransmit messages or data to ensure that the video communication reaches all participants. In at least some embodiments, peer-managed video communications may not include a centralized video communication coordinator, server, system, or service, but may instead allow the participant devices as peers to manage or coordinate the transfer of video communication data among the participant devices.

Figure 1A:
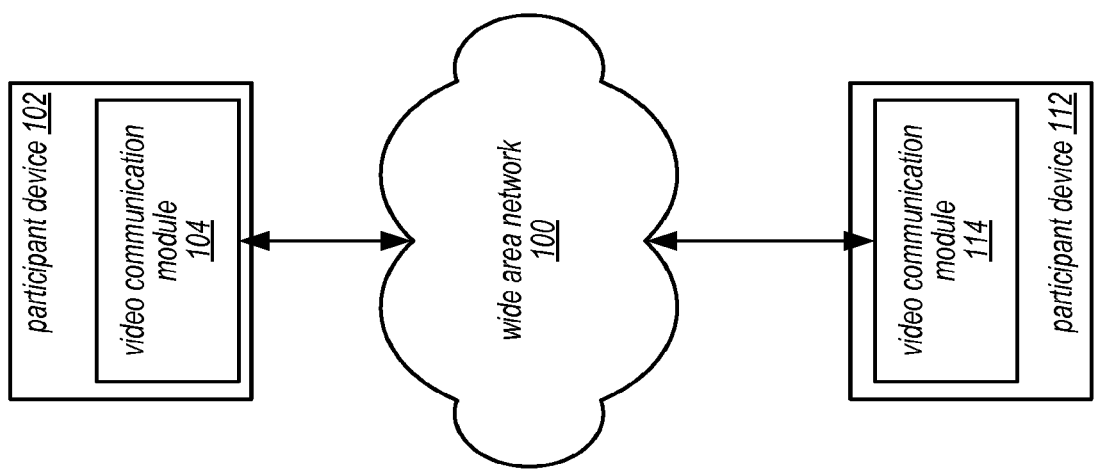
Figure 3:
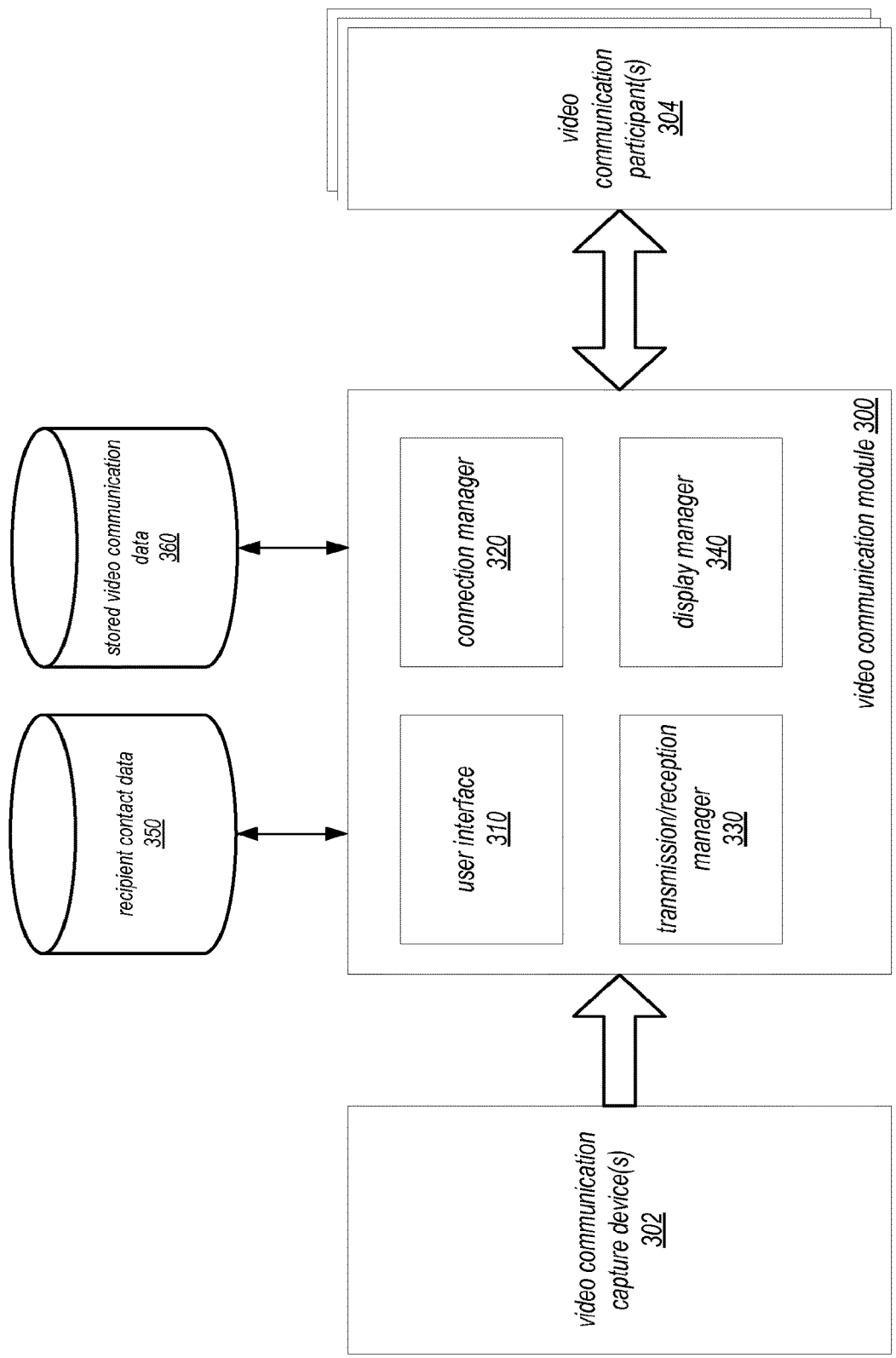
FIG. 3 is a block diagram of a video communication module, according to some embodiments.

FIGS. 1A and 1B illustrate peer-managed video communications between different participants, according to some embodiments. Participant devices (e.g., participant devices 102, 112, 122, 132, 142, 152, and 162) may be implemented on different devices or types of devices. Examples of participant devices may include, a portable-multifunction device illustrated in FIGS. 22-24, such as multifunction device 3000, other types of mobile computing devices or phones, computers, laptops, personal digital assistants (PDAs), or any computing system, such as computing system 4000 described below with regard to FIG. 25. Respective video communication modules (e.g., video communication modules 104, 114, 124, 134, 144, 154, and 164) may be implemented at each participant device in order to facilitate video communications over wide area network 100. Video communication modules may be implemented in many different ways. FIG. 3, described in detail below, provides an example of some embodiments of a video communication module.

Different video communications may be established by video communication connections through wide area network 100 (e.g., the Internet). In FIG. 1A, for instance, a two-way video communication may be established between participant device 102 and participant device 104. While in FIG. 1B, a multi-way video communication may be established between among participant devices 124, 134, 144, 154, and 164. Participant devices may be configured to access wide area network 100 in different ways. For example, participant device 102 may be configured to access a particular wireless network, such as a cellular network, that may communicate with wide area network 100, by use of gateway. A gateway may provide a packet oriented mobile data service, such as General Packet Radio Service (GPRS), or other mobile data service allowing wireless networks to transmit data to other networks, such as wide area network 100. Likewise, different access devices or points (e.g., IEEE 802.11g wireless access router or device) can provide communication access to wide area network 100. Participant device 112 may, for instance, be configured to (or authorized to) utilize the access devices to obtain access to wide area network 100. Thus, in various embodiments, participant devices can access wide area network 100 in different ways and still establish video communications. Thus, the previous examples are not intended to be limiting as to other ways in which access to wide area network 100 may be obtained for a participant device.

Video communication data for video communications may itself be exchanged utilizing various transportation formats or protocols suitable to or capable of being communicated via wide area network 100, including but not limited to SIP (Session Initiation Protocol), STUN (Session Traversal Utilities for NAT), TURN (Traversal Using Relay NAT), ICE (Interactive Connectivity Establishment), RTP (Real-time Transport Protocol), SRTP (Secure RTP). Video communication modules may be configured to format, process, transmit, send, or receive according to the various transportation protocols, as well as encrypt, compress, encode, decrypt, decompress, and decode video communication data (e.g., audio and/or video data).

Figure 2A:
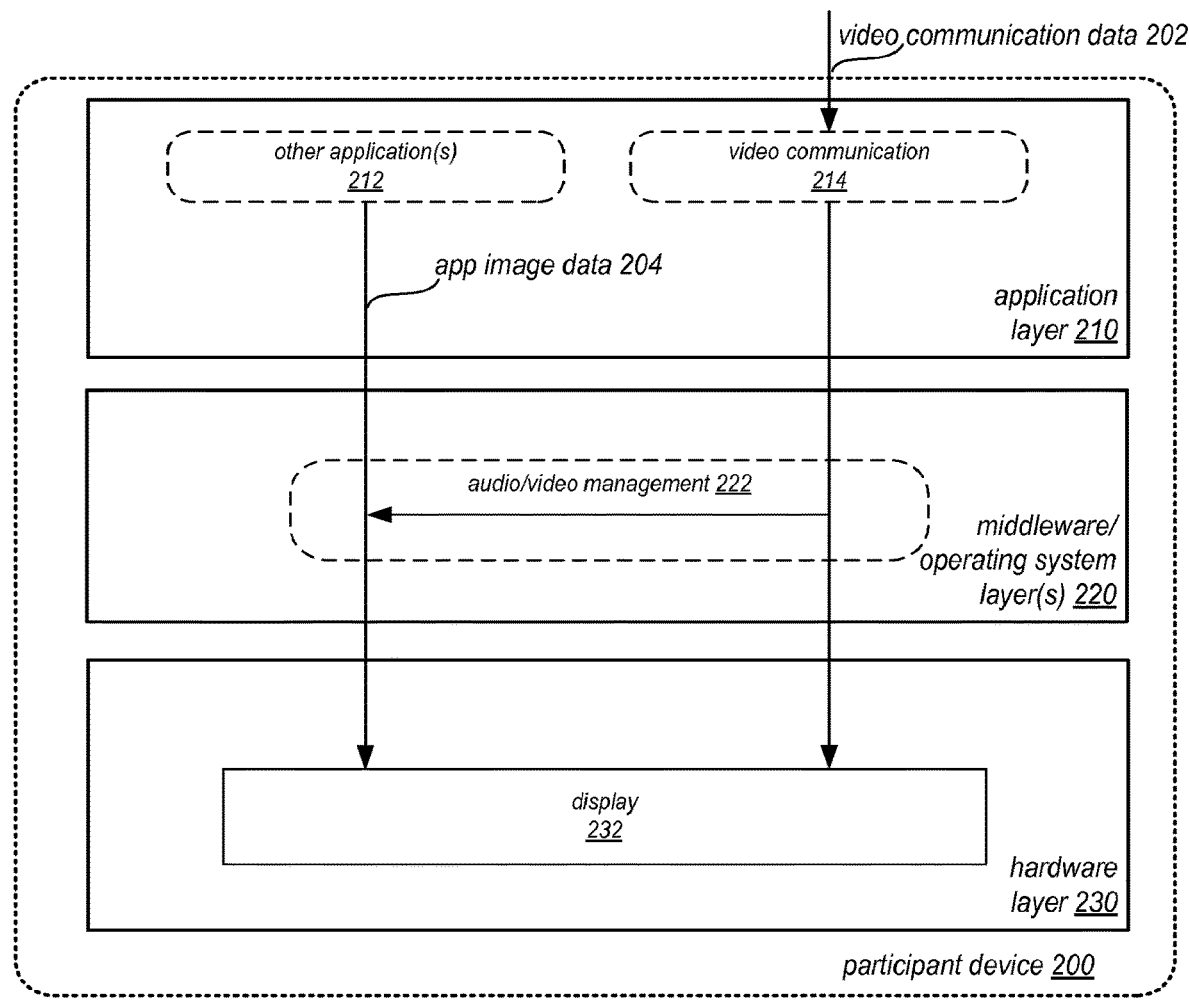
FIG. 2A is a block diagram illustrating dynamic display of video communication data at a participant of a video communication, according to some embodiments.

FIG. 2A is a block diagram illustrating dynamic display of video communication data at a participant device in a video communication, according to some embodiments. Participant device 200 may be any one of participant devices 102, 112, 122, 132, 142, 152, or 162, of portable multi-function device 3000 described below with regard to FIGS. 22-24 or computing system 4000 described below with regard to FIG. 25.

Participant device 200 may implement multiple layers of functionality for performing various tasks or applications, such as video communication. Application layer 210 may provide for the implementation of applications, such as video communication application 214 (similar to video communication modules discussed above with regard to FIG. 1) as well as many other application(s) 212. Applications implemented in application layer 210 that are currently executing on participant device 200 may access data, features, services, controls, or other functionalities of participant device 200 via one or more different objects or programmatic interfaces (APIs) for the respective data, features, services, controls, or other functionalities of participant device 200 implemented in middleware/operating system layer(s) 220. Participant device 200 may implement various middleware layer(s) 220 and/or an operating system layer 220 in order to provide services. An operating system may, for instance, provide access to and/or management of hardware devices implemented in hardware layer 230, such as display device 232, or other devices, components, or subsystems, or circuits. Participant device 200 may include hardware layer 230 which includes various hardware components, such as electronic display 232, other input/output devices (e.g., microphones, keyboards, touch-sensitive areas—which may also be electronic display 232, speakers) or other hardware components that implement participant device 200, processors, graphics accelerators, or other components (such as those discussed below with regard to portable multi-function device 3000 or computing system 4000).

As illustrated in FIG. 2A, video communication application 214 may be implemented in application layer 210. Video communication application 214, such as those video communication modules discussed above with regard to FIG. 1 or in more detail below with regard to FIG. 3, may perform video communications with other participants over networks, as discussed above with regard to FIGS. 1A and 1B. Video communication data 202 may be received at video communication application 214 as part of a current (or initiated) video communication with one or more other participant devices. Video communication application 214 may be configured to process video communication data 202 (e.g., decrypt, un-compress, decode) or otherwise prepare video communication data for display. Video communication application 214 may then as part of performing the current video communication make one or more calls or requests to audio/video management module 222 in order to ultimately display the video communication data on display 232. In various embodiments, video communication data may include video communication data from multiple different participants participating as part of the same video communication (e.g., a multi-way video communication).

In various embodiments, video communication 214 may operate in different display modes. Full-screen display mode, for instance, may allow video communication application 214 control of most or all of the display 232 for implementing the video communication including other video/image data for user interface elements or graphics (e.g., windows, toolbars, or buttons) that format or frame the video communication data displayed. In at least some embodiments, integrated display mode may be employed when another application 212 or components (e.g., an operating system interface) is displaying image data, video data, or any other form of graphical display on display 232.

Audio/video management component 222 may provide software hooks, display attributes, or other techniques to direct the display of video communication data in either the full-screen mode or the integration display mode. For example, if video communication application 214 is operating in full-screen mode, then audio/video management component may determine a display location within display 232 for the video communication data 202 that is specified or requested by video communication application 214, which may consume most of display 232. FIG. 2C, for instance, illustrates a participant displaying video communication data in a full-screen mode for a video communication, according to some embodiments.

In some embodiments, video application module 214 may be operating in integration display mode. For instance, other application 212 may be currently executing. As part of the execution of other application 212, application image data 204 (or video or other graphics data) may be obtained, received, or generated and displayed on display 232, as indicated by the arrow from other applications 212 through audio/video management module 222 to display 232. Video communication data 202 for a video communication initiated prior to or during the execution of other application 212 may also still be received. Audio/video management module 222 may be configured to identify a display location within display 232 for video communication data 202. This identification may be made dynamically as display attributes for the video communication data may be configured at runtime by other application 212. For example, other application 212 may define software hooks, or event detection mechanisms that configure display attributes if video communication data is received for display. In this way, video communication data 202 may be displayed in a location that is optimized to allow app image data 204 to be displayed as intended, even though a current video communication may be ongoing, as indicated by the arrow within audio/video management module 222. In at least some embodiments, video communication data may be blended or integrated directly with app image data 204 or other video or graphic data encoded as a single stream of data for display, as discussed below with regard to FIG. 5. Audio/video management module 222 may coordinate or manage software or hardware resources (e.g., video encoders) which may be utilized for app image data 204 and video communication data 202.

Figure 2B:
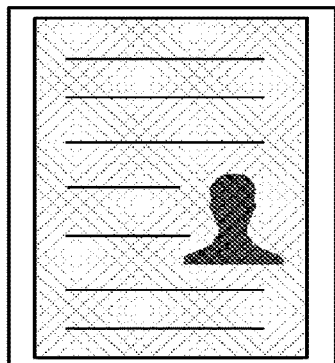
FIG. 2B illustrates a participant device displaying video communication data in an integration display mode for a video communication, according to some embodiments.
Figure 2C:
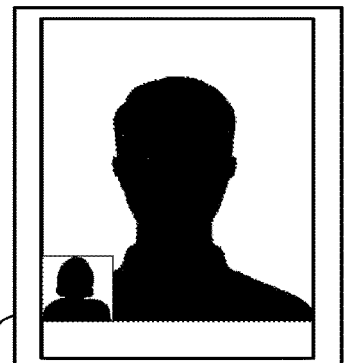
FIG. 2C illustrates a participant displaying video communication data in a full-screen display mode for a video communication, according to some embodiments.

FIG. 2B illustrates a participant device displaying video communication data in an integrated display mode for a video communication, according to some embodiments. Video communication data 202 is integrated with app image data 204 according to the display attributes configured by other application 212, placing the video communication data 202 in a location within participant device display 232 that does not hinder display of app image data 204 (e.g., a blank or dead space, or within image data that may be easily adapted to work around video communication data 202). Please note that although the above example integration display mode is given with regard to an application in application layer 210, it may be also that a component of middleware/operating system layer(s) 220 (e.g., an operating system user interface) may also configured display attributes for video communication data so as to display video communication data 202 in a way that accommodates image or other graphics data displayed for the component of middleware/operating system layer(s) 220.

In various embodiments, audio/video management module 222 may be configured to determine the display mode of a current video communication, whether full-screen or integration display mode. However, in some embodiments, video module application 214 may determine or maintain the state of the display mode and provide an indication of, or format requests to, audio/video management component 222 so that audio/video management module 222 handles video communication data 202 according to the current display mode. Input may be received, in some embodiments, to switch between full-screen display mode and integrated display mode.

Video application 214 may also be configured to provide to audio/video management 222 for display user interface elements. These user interface elements may also be displayed according to the determined location (e.g., within the determined location as specified by video application module 214) or various other locations in display 232 (e.g. as may be indicated by other display attributes configured at runtime by other application 212). Video communication application 214 may handle input received via these user interface elements (e.g., pause, resume, end).

Video communication applications may be implemented in many different ways in order to facilitate video communications over networks. FIG. 3 is a block diagram of a video communication module, according to some embodiments, that may implement video communications. Please note that the various components illustrated in FIG. 3 may be implemented in hardware, software, or any combination thereof. Where single components are illustrated it may be understand that multiple components may alternatively be implemented to provide the same functionality. Thus, the following discussion regarding FIG. 3 is not intended to be limiting as to the implementation of a video communication module. Video communication module 300 may be implemented on a variety of different types of participant devices, such as mobile computing devices, mobile phone, laptops, or other portable multi-function devices (such as video communication module 3039 implemented as part of portable multi-function device 3000 in FIG. 22) or computing devices (such as computing system 4000 described below with regard to FIG. 25).

In various embodiments, video communication module 300 may implement a user interface 310 to receive, process, parse, or handle input for the video communication module 300 from a user. For example, in some embodiments, user interface 310 may provide multiple user interface elements that are selectable via an I/O device. If, for instance, the participant device implements a touch-sensitive display, then the user interface elements may be selected by touch, gesturing, or otherwise conveying selection of a particular user interface element. In some embodiments with a touch-sensitive display, user interface elements need not be displayed, but instead the touch gestures may themselves interpreted or parsed to indicate or convey the election of certain actions via the user interface. User interface 310 may implement many different elements for video communication module 300, including, but not limited to, initiating a video communication (either in a 2-way or in a multi-way mode with other participant devices), ending a video communication, pausing a video communication, resuming a video communication, switching between display modes, formatting display of visual communication data, selecting input devices (e.g., cameras), muting audio, recording audio/video/still images of video communication data, or any other component that provides input or direction to video communication module 300 from a user. Other input devices, such as computer mices, keyboards, voice commands or recognition, physical movement of a participant device (turning, tipping, or flipping the device) may also be input, translated or detected via user interface component 310, in some embodiments.

Video communication module 300 may implement connection manager 320, in various embodiments. Connection manager 320 may be configured to establish connections for video communications with video communication participant(s) 304. For instance, connection manager 320 may access recipient contact data 250 for identification information to establish a connection one or more participant devices (as may be requested by a user). Various different protocols or formats may be implemented by connection manager 320 to establish video communication connections, such as those discussed above with regard to FIGS. 1A and 1B. In some embodiments, connection manager 320 may be configured to maintain instant or pre-established connections so that some video communications may appear to be initiated and/or displayed in real-time (as discussed below with regard to FIGS. 18-21). Connection manager 320 may also be configured to handle dynamic transitions from video messages received at a participant device into a live video communication, as well as transitions back to an offline video messaging format, in various embodiments (as discussed below with regard to FIGS. 14-17).

In at least some embodiments, video communication module 300 may have access to one or more persistent storage devices or data stores that maintain recipient contact data 350 and stored video communication data 360. In some embodiments, recipient contact data 350 may be identities, address, or other network/transmission information to establish a video communication connection and transmit/receive video communication data via the video communication connection with a particular video communication participant. In some embodiments, stored video communication data 360 may be stored versions of currently ongoing or prior video communications (as well as other data related to them, such as still images or audio recordings). Stored video communication data 360 may be accessed for playback or display, either by video communication module 300 or another application, component of a participant device. In some embodiments, stored video communication data 360 may not be stored locally with respect to the participant device implementing video communication module 300, but may instead be stored in a remote storage location (e.g., a media server) accessible to video communication module 300.

As illustrated in FIG. 3, video communication module 300 may receive video communication data (video and/or audio data) from video communication capture device(s) 302). For example, an on-board video camera and/or on-board microphone (e.g., optical sensors 3064 and/or audio circuitry 3030 in FIG. 22), externally coupled video camera and/or externally coupled microphone may be used to capture video and/or audio data for transmission to video communication participant(s) 304. Video communication module 300 may implement transmission/reception manger 330 to handle outgoing and incoming video communication data for a video communication, in some embodiments. For instance, transmission/reception manager may encode, encrypt, compress and/or otherwise format captured video communication data for transmission to video communication participant(s) 304 and direct the sending the video communication data according to various communication protocols to video communication participant(s) 304, such as discussed above with regard to FIGS. 1A and 1B. For incoming video communication data for a video communication, transmission/reception manager 330 may be configured to decode, decrypt, decompress, or otherwise reformat data for display. Display manager 340 may direct the display of received video communication data according to either a full-screen display mode and/or an integration display mode, in some embodiments. Display manager 340 may also provide the video communication data to an audio/video management component (e.g., audio/video management module 222 in FIG. 2) or another application for further processing prior to display.

In various embodiments, communication module 300 may implement various ones of the methods, techniques, and/or components discussed below with regard to FIGS. 4-21. However, some embodiments, may implement only particular ones, such as only techniques of FIG. 4, FIG. 12, FIG. 14, or FIG. 17. Thus, FIG. 3 is not limited to any particular combination or arrangement of components or implementation of techniques described below.

Figure 4:
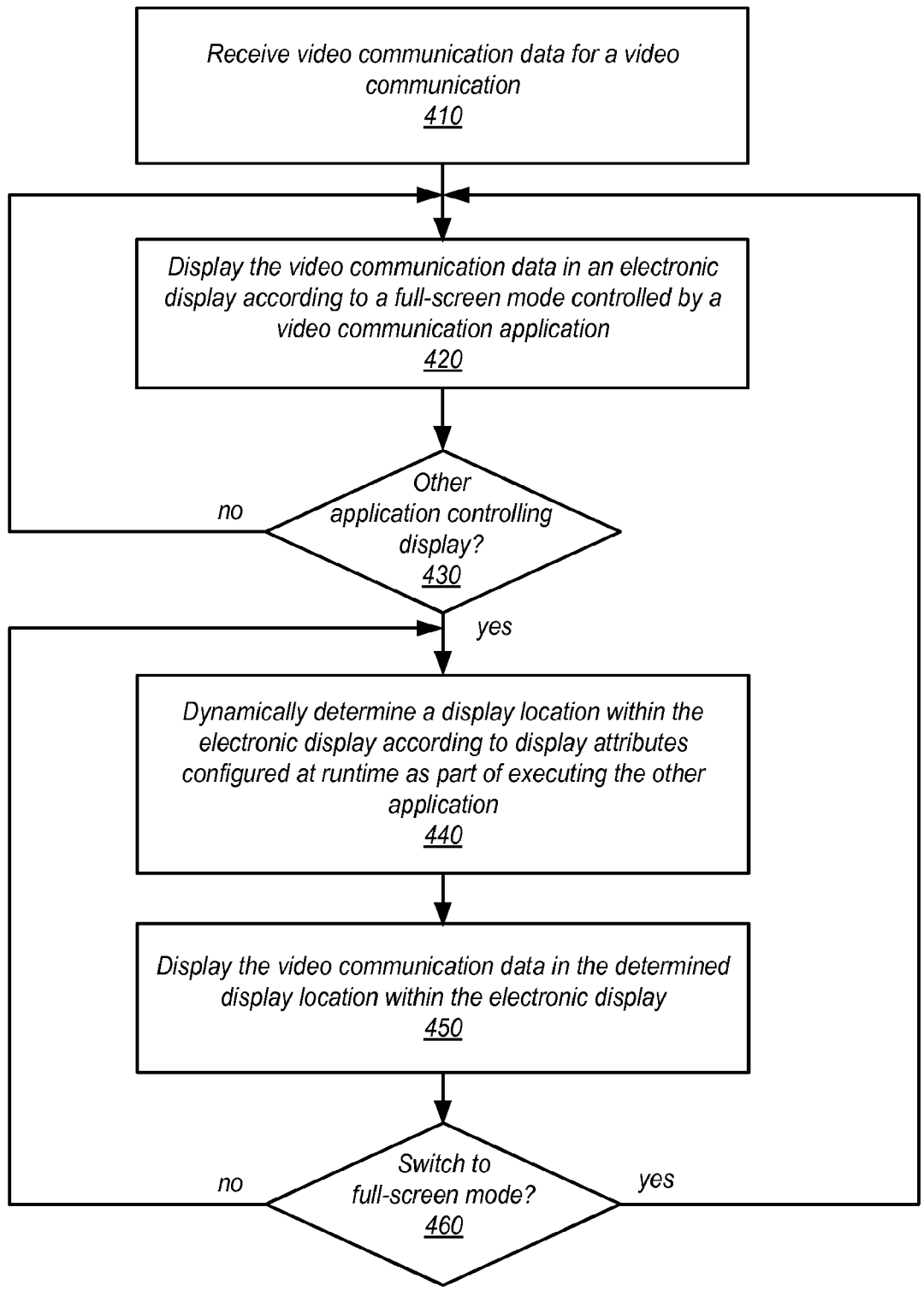
FIG. 4 is a high-level flowchart illustrating methods and techniques for dynamic display of video communication data, according to some embodiments.

As noted previously, dynamic display of video communication data may be implemented as part of various different components or devices of a participant device. An application that is itself executing on the participating device may perform the following techniques in order to incorporate video communication data into graphics displayed for the application on an electronic screen. Similarly, a video application module itself may be configured to implement the techniques such that the display location for video communication data is dynamically determined even though another application may be controlling an electronic display. Alternatively, as illustrated above in FIG. 2A, a middleware/operating system component may implement the following techniques. FIG. 4 is thus a high-level flowchart illustrating methods and techniques for dynamic integration of video communication data, according to some embodiments, which may be implemented by various system components or devices.

As indicated at 410, video communication data may be received for display as part of a current video communication. The video communication data may include video and/or audio data to be displayed or presented. In various embodiments, if a video communication application is operating in full-screen mode, then the video communication data may be displayed in an electronic display according to a full-screen mode, as indicated at 420. The full-screen display mode may, in some embodiments be controlled by the video communication application. However, other applications may also trigger or initiate full-screen display mode, in some embodiments. In some embodiments, video communications may be displayed in full-screen display mode by default, unless otherwise specified by another application, operating system/middle ware component, or the video communication application. If no other application is controlling the electronic display, as indicated by the negative exit from 430, then the video communication data may continue to be displayed in full-screen display mode (or as otherwise specified by the video communication application.

Figure 5:
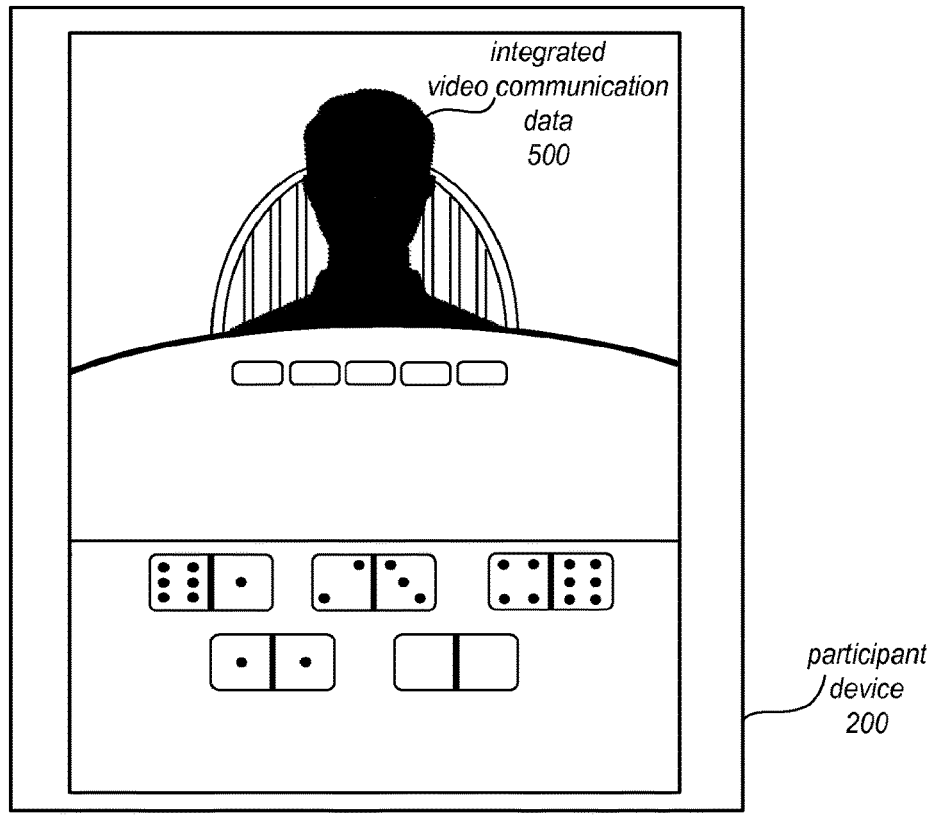

If another application is launched, initiated, resumed, woken up, or otherwise begun such that the other application is controlling the electronic display in order to display image data, as indicated by the positive exit from 430, then a display location for the video communication data may be dynamically determined according to display attributes configured at runtime as part of executing the other application, in various embodiments, as indicated at 440. Other applications launched may be any application that utilizes or controls the electronic display, from games and other media, to other communication applications (including other video communication applications or screen sharing applications), as well as various tools, tasks, or other processes that an application may be configured to perform. Software hooks, event listeners, middleware or operating system provided API calls or other devices may allow the other application to define where, how, and/or when the video communication data is displayed, defining and redefining the display attributes as the application sees fit. Dynamically determining a display location may, in many embodiments, allow the other application to blend or integrate the video communication data into data that is received, generated, or otherwise obtained via the current video application. For example, FIG. 5 illustrates a participant device 200 that displays integrated video communication data 500. In FIG. 5, a gaming application may receive video communication data (e.g., the image of a user of the other participant device) which may blend the image data of the user into a particular scene of the game (e.g., as an opponent in a dominoes game) at particular location within the electronic display. Stated more generally, the other application may be able to control, transform, modify, or otherwise adapt the video communication data to be rendered differently on the electronic display in a way that is different than the video communication data would be displayed as originally received. Thus, the video communication data may be dependent on the other application such that a single video stream may be generated for display that includes the video communication data, instead of just displaying an independent stream of video data.

Figures 6A, 6B, 6C:
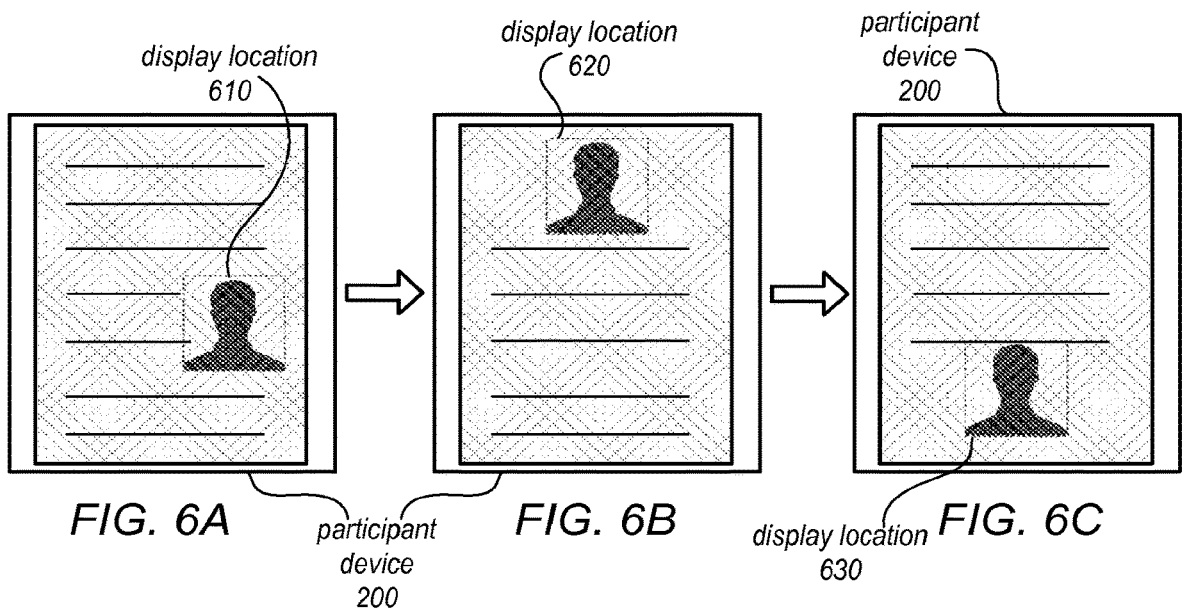

As indicated at 450, the video communication data may then be displayed at the determined display location within the electronic display. If no change in the display mode is made (e.g., a switch to full-screen display mode), as indicated by the negative exit from 460, then the determination of a display location for video communication data, as indicated at 440, and the display of the video communication data 450 may be repeated. In this way, the other application may change the display location of the video communication data over time. FIGS. 6A through 6C illustrate different display locations for video communication data that may be determined over time. For example, display location 610 for the video communication data in FIG. 6A may be initially determined when the other application first begins executing. If however, the other application changes (e.g., in response to user input) the display of data on the electronic display, then the display location for the video communication data may also change. For instance, consider an example of the other application that is shared book reading experience via the electronic display. In between FIGS. 6A and 6B, a virtual page in the shared book application is "turned," so the location wherein the video communication data may be best displayed has changed to display location 620. Similarly, display location may change again between FIGS. 6B and 6C, changing from display location 620 to display location 630.

As indicated by the positive exit from 460, a change to full-screen display mode may change the control of displaying video communication data back to the video communication application. Please note, that in some embodiments, a video communication may be started while the video communication application is considered to be in integration display mode. For instance, the other application may already be running and displaying graphics on the electronic display. Thus, after receiving the video communication data, as indicated at element 410, a display location for the received video communication data may then be dynamically determined, as indicated at 440 (without first displaying the video communication in full-screen display mode).

Figure 7:
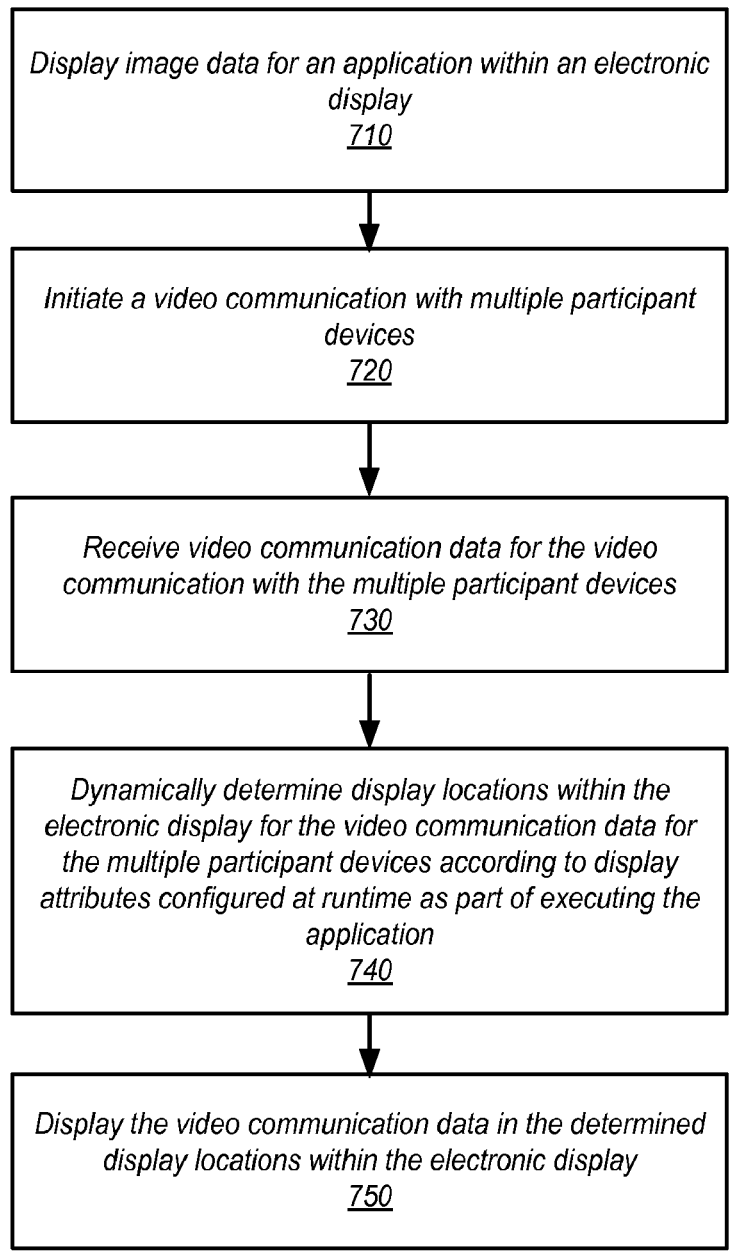
FIG. 7 is a high-level flowchart illustrating methods and techniques for dynamically displaying video communication data for multiple participants in a video communication, according to some embodiments.

FIG. 7, discussed below provides a similar example of initiating video communications in integration display mode, and although it describes a multi-way video communication the same techniques may be applied for a video communication between two participants, in at least some embodiments.

FIG. 7 is a high-level flowchart illustrating methods and techniques for dynamically displaying video communication data for multiple participants in a video communication, according to some embodiments. As indicated at 710, image data (or other video or graphics) may be displayed for an application within an electronic display. While the application is running, a video communication may be initiated with multiple users, as indicated at 720. For example, an interface element or other component may be selected to start the video communication. Alternatively, an incoming connection for the video communication with multiple participants may be received, in some embodiments.

As indicated at 730, video communication data for the video communication data may be received that includes video communication data for each of the multiple participants, in various embodiments. For instance, separate data streams transmitted from each of the participants may be received. One or more display locations may be dynamically determined for the video communication data within the electronic display according to display attributes configured at runtime as part of executing the application, as indicated at 740. Once the display locations are determined for the multiple participants, the respective video communication data corresponding to each participant may be displayed in the determined display location, as indicated at 750. Please note, that video communication data for different respective participants may arrive at different times, and thus the video communication data for each participant may be displayed independently of the other participants. For example, video communication data for participant C may be displayed prior to video communication data for other participants. In some embodiments, as participants are added to or leave the video communication, the display of the respective video communication data for the additional participant may be added (according to a dynamically determined display location) or removed.

Figure 8:
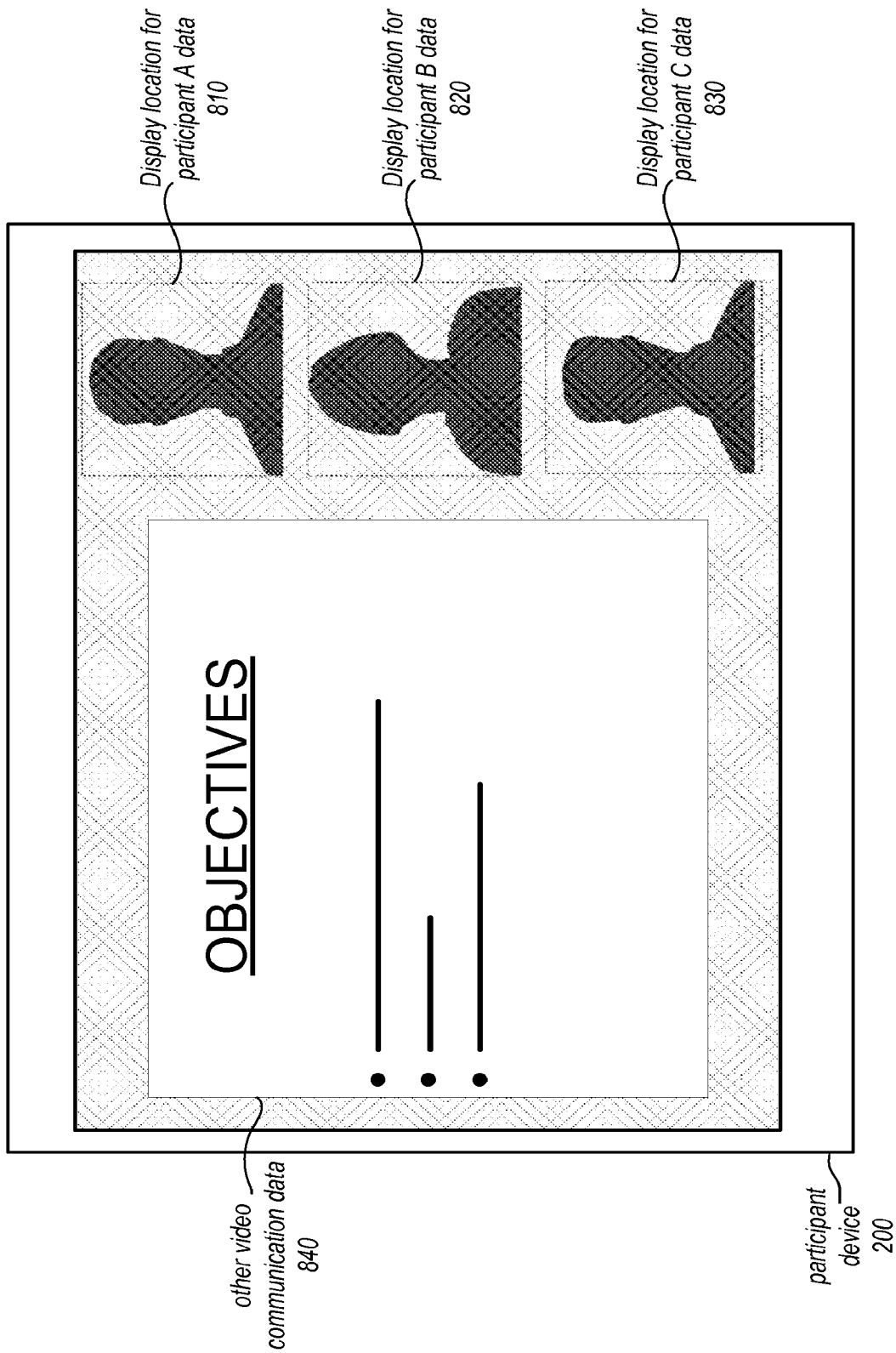
FIG. 8 illustrates dynamically displayed video communication data in an electronic display of a participant device for multiple participants in a video communication, according to some embodiments.

For example, FIG. 8 illustrates dynamically displayed video communication data in an electronic display of a participant device for multiple participants in a video communication, according to some embodiments. Different respective display locations in the electronic display of participant device 200 may be determined for multiple participants. For video communication data for participant A, display location 810 is determined. For video communication data for participant B, display location 820 is determined. For video communication data for participant C, display location 830 is determined. In some embodiments, the other application may be another video communication or transmission application, such as a screen sharing application. Other video communication data 840 may, for instance, be information shared among the respective electronic displays via the screen sharing application for participants in the video communication.

Figure 9:
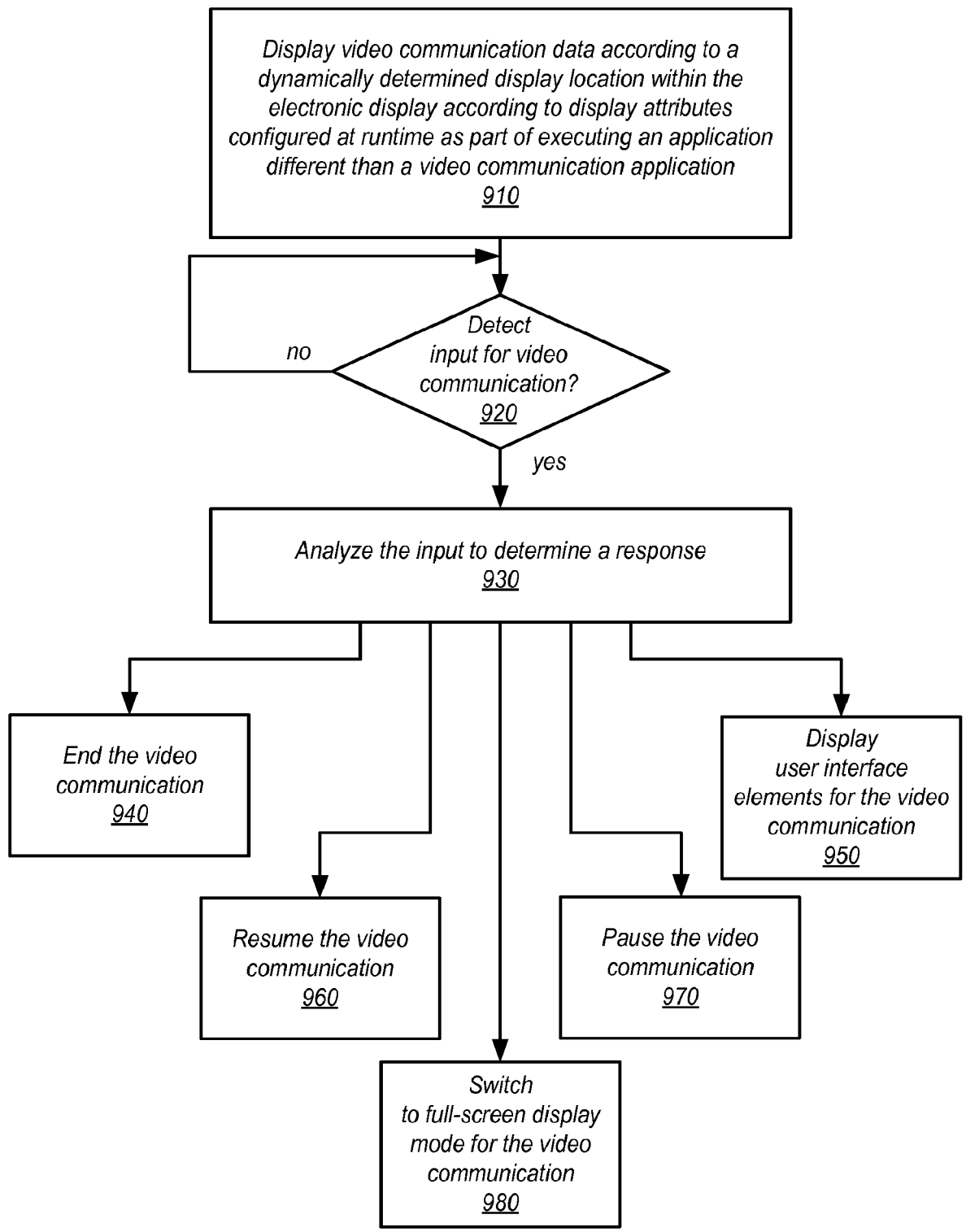
FIG. 9 is a high-level flowchart illustrating methods and techniques for handling input for video communication data that is dynamically displayed, according to some embodiments.
Figure 10:
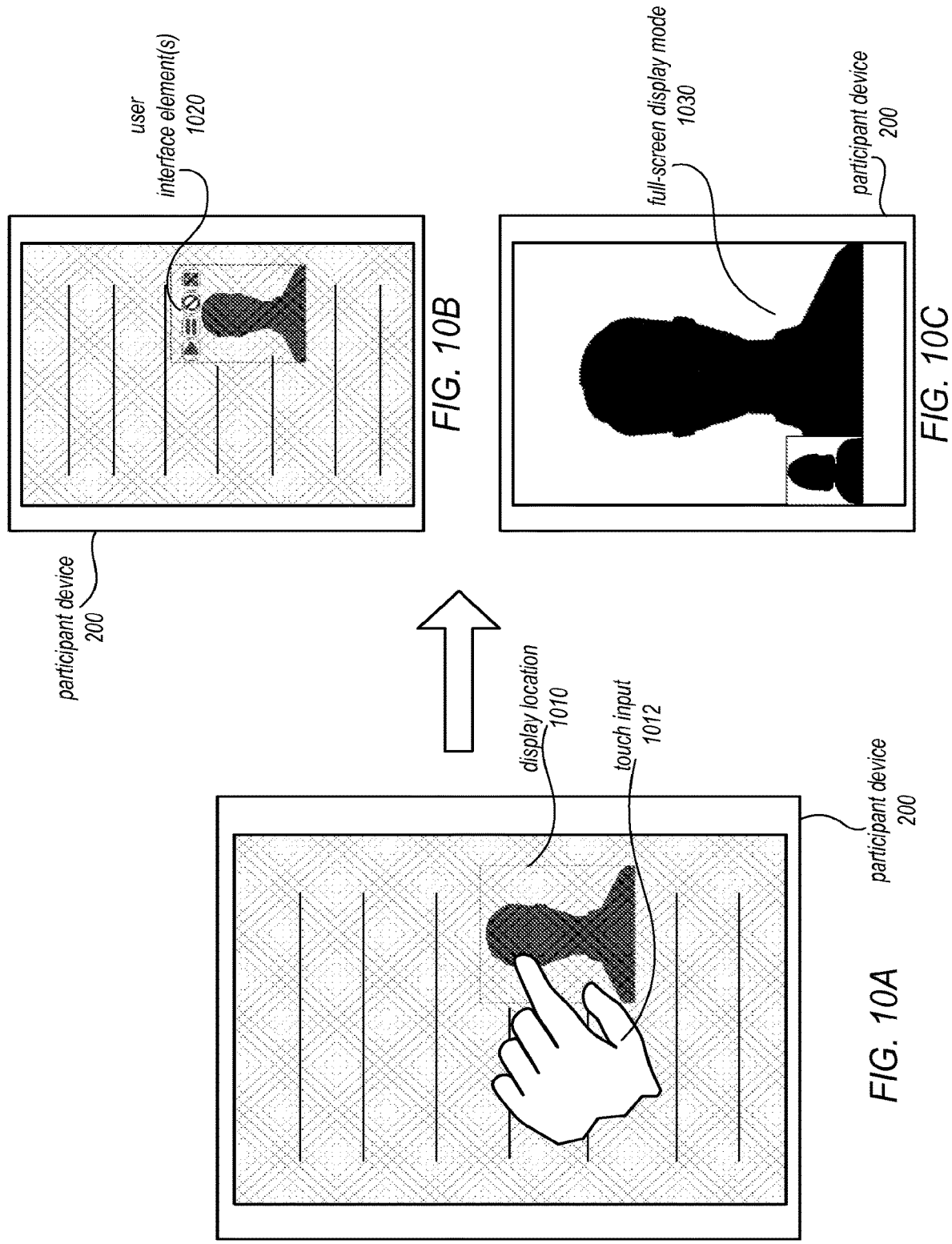
FIGS. 10A-10C illustrates examples of handling input for video communication data that is dynamically displayed, according to some embodiments.

Input for a video communication in integrated display mode may still be handled, even though another application is executing and controlling the electronic display. The video communication application may, in some embodiments, handle the received input, and imitate appropriate responses. FIG. 9 is a high-level flowchart illustrating methods and techniques for handling input for video communication data that is dynamically displayed, according to some embodiments. As indicated at 910, video communication data may be displayed according to dynamically determined display locations within the electronic display. The determination of display locations may be performed, as discussed above, with regard to display attributes configured as part of the execution of an application different than a video communication application. As indicated at 920, input for the video communication may be detected. For example, the electronic display may be touch sensitive and one or more touch gestures or input may be detected via the electronic display, in some embodiments. Other input devices, such as computer mice, trackballs, keyboards, or voice commands, may also communicate input for the video communication.

If input is detected, as indicated by the positive exit from 920, the input may be analyzed or parsed to determine a response, in various embodiments, as indicated at 930. For example, one or more user interface elements may be displayed, and selection of a particular user interface element corresponding to a particular response may be determined. These user interface elements may, in some embodiments be displayed dynamically as well, under the control of the other application. In another example, specific gestures for a touch-sensitive input device, such as a touch-sensitive electronic display, may be interpreted and correspond to particular actions.

One response that may be determined is ending the video communication, as indicated at 940. For example, a user interface element for ending the video communication may be selected, and in response the video communication connection may be terminated. In another example, a particular gesture, such as a particular touch swipe in a particular direction may also be interpreted as a request to end the video communication, such as touch input 1012 illustrated in FIG. 10A.

A response that may be determined is the display of user interface elements for the video communication, as indicated at 950. For example, FIG. 10A illustrates a participant device 200 displaying video communication data for a current video communication at display location 1010. Touch input 1012 may be detected within display location 1010. As illustrated in FIG. 10B, additional user interface elements 1020 may be displayed within display location 1020, which may allow for further control of the video communication (e.g., pause, resume, end, or switch to full-screen display mode). Further touch input with respect to these user interface elements 1020 may then be detected, in some embodiments.

Another response that may be determined is the resumption of the video communication, as indicated at 960. For example, the touch input 1012 in FIG. 10A may be particular gesture (e.g., a single tap) to resume the video communication from a paused state, in some embodiments. Similarly, another response that may be determined is a pause of the video communication, as indicated at 970. A pause user interface element may be selected, for instance, or a particular action or touch gesture taken with respect to the participant device (e.g., turning the participant device another direction).

A response may be to switch from an integration display mode to a full-screen display mode, as indicated at 980. For example, the touch input 1012 in FIG. 10A may be particular gesture (e.g., a double tap or a directional swipe) to switch to full-screen display mode, in some embodiments. As illustrated in FIG. 10C, participant device 200 illustrates the video communication in full-screen display mode 1030 after the input 1020 illustrated in FIG. 10A.

As noted above, dynamic pause and resume may be implemented for a video communication, according to some embodiments. Mobile computing devices, such as mobile telephones, laptops, personal digital assistants (PDAs), portable multi-function computing devices (e.g., portable multi-function computing device 3000 in FIGS. 22-24), or computing systems (e.g., computing system 4000) may have limited connectivity or access to networks over which video communications may be transmitted. Video communications, like in-person conversations, may experience fluctuations in the active exchange of information. However, video communications may continue to transmit video communication data even though little or no active exchange of information is occurring. Dynamic pause and resume may allow for the transmission of video communication data to correspond to the exchange of information between participants in a video communication. The transmission of data for the video communication from a participant device may be evaluated to dynamically determine whether the transmission of video communication data (or at least some of the video communication data) may be paused or resumed.

Figure 11:
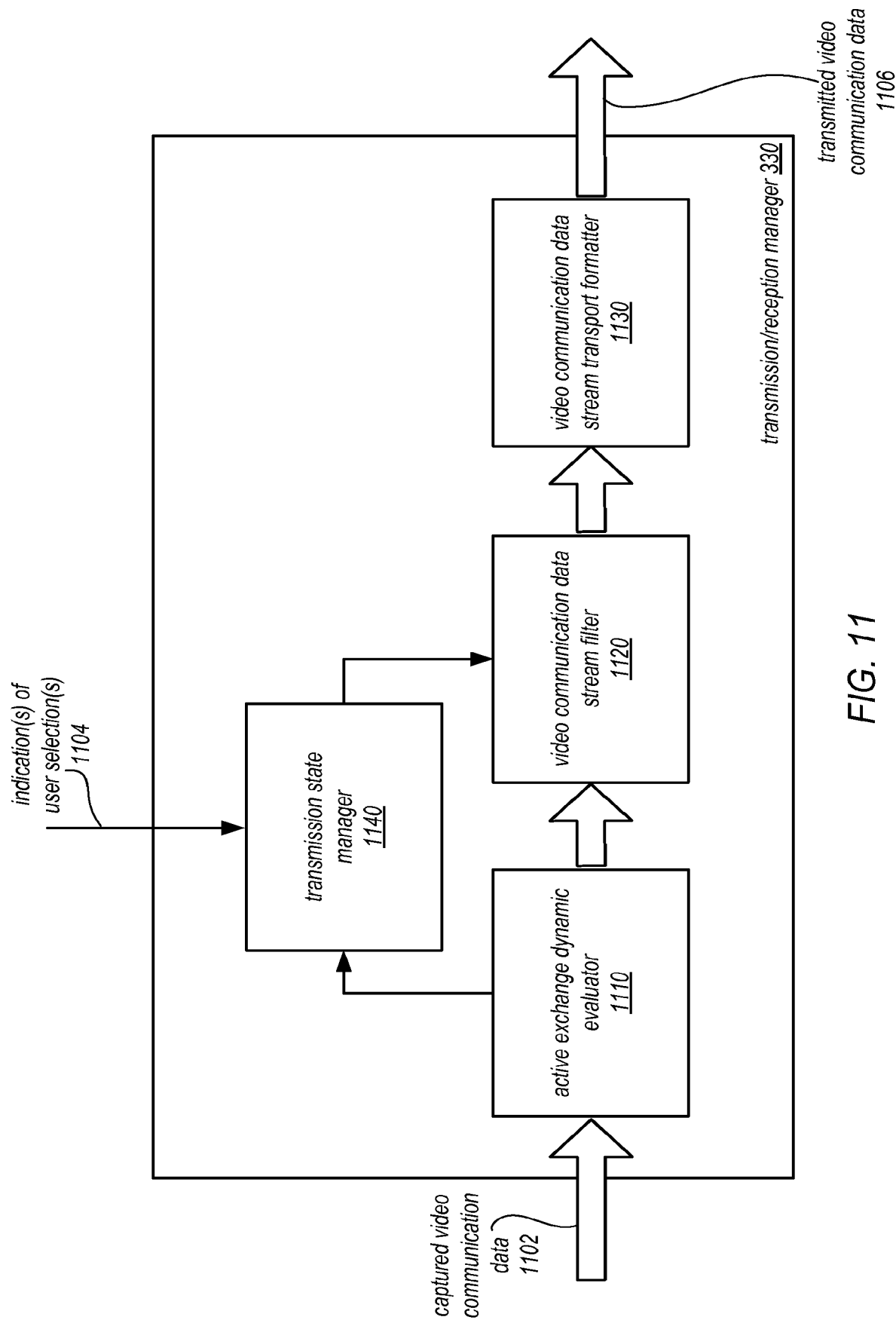
FIG. 11 is a block diagram illustrating an example transmission/reception manager module for a video communication module that implements dynamic pause and resume for transmission of video communication data, according to some embodiments.
Figure 13:
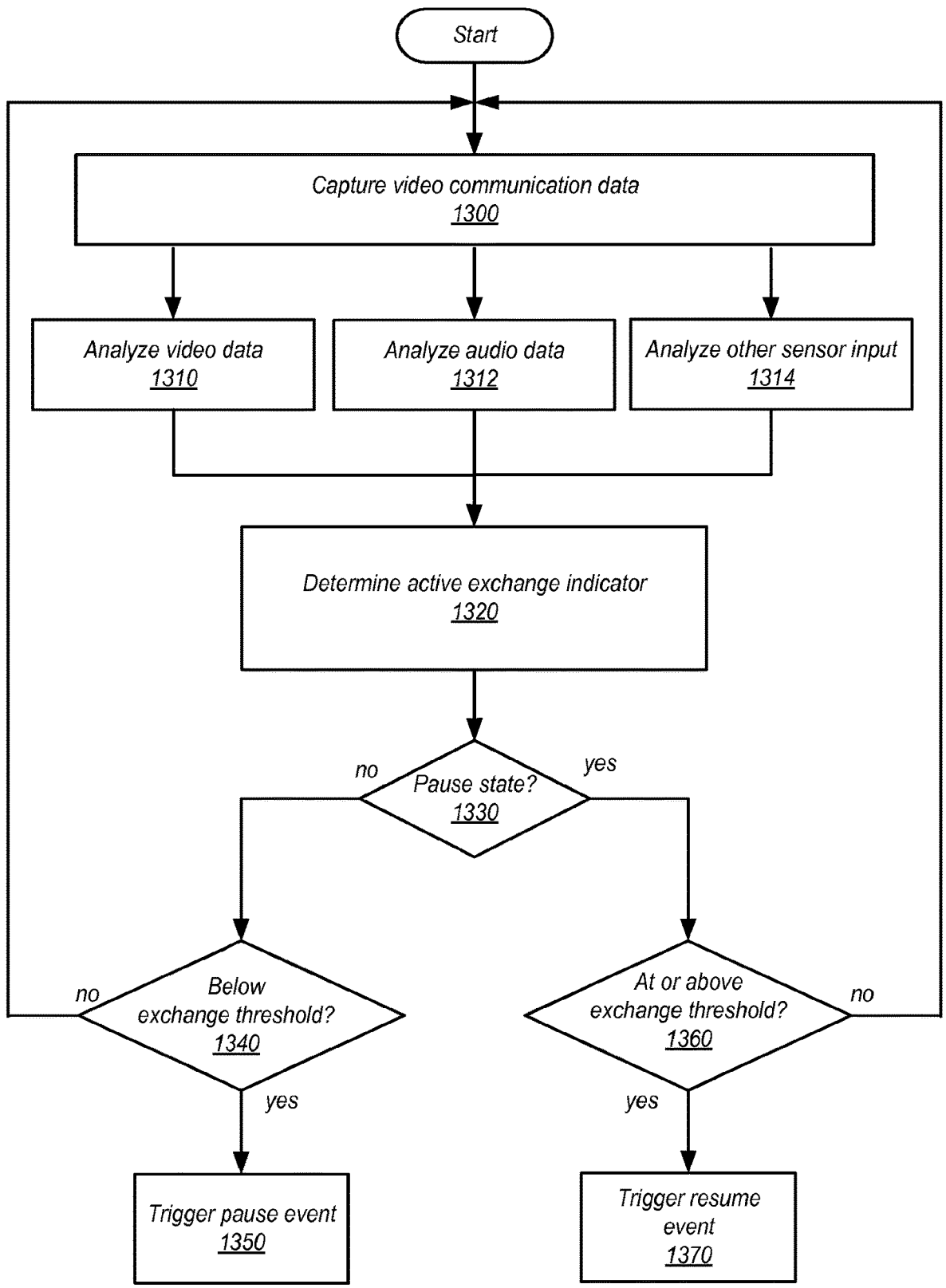
FIG. 13 is a high-level flowchart illustrating methods and techniques for determining an active exchange indicator of a video communication, according to some embodiments.

FIG. 11 is a block diagram illustrating an example transmission/reception manager module for a video communication module implementing dynamic pause and resume for transmission of video communication data, according to some embodiments. Video communication module 300 may implement transmission/reception manager 330, as discussed above with regard to FIG. 3. Captured video communication data 1102 may be received at transmission/reception manger 330 to be transmitted 1106 to participant devices as part of the video communication. The stream of captured video communication data may be evaluated. For example, transmission/reception manager 330 may implement active exchange dynamic evaluator 1110 to dynamically evaluate the stream of video communication data to detect pause or resume events. Various different video analysis techniques (e.g., facial recognition), audio analysis techniques, other sensor information, as well as user provided information (e.g., interaction with applications at the participant device) may be implemented by active exchange dynamic evaluator 1110 to evaluate the stream of video communication data. FIG. 13, discussed below, provides further examples of techniques that may be implemented to detect pause or resume events. Once detected, the pause or resume events may be conveyed to transmission state manager 1140.

Transmission/reception manager 330 may implement transmission state manager 1140 to maintain the current transmission state of a video communication. For example, the transmission state manager 1140 may indicate whether the video communication is paused, as well as what video communication data may be allowed to be transmitted (if any) when the video communication is paused. If, for instance, video data is filtered out, while audio data for the video communication is still transmitted, then transmission state manager 1140 may indicate that the video data is filtered out. In various embodiments, indications of user selection(s) 1104 to manually pause and resume the video communication (as opposed to the pause and resume events detected by active exchange dynamic evaluator) may also be received and update the indicated state of the transmission at transmission state manager 1140.

In some embodiments, transmission/reception manager 330 may implement video communication data stream filter 1120. Dependent on the current transmission state, video communication data stream filter 1120 may pause or filter some of the transmission data, such as video data, audio data, or both video and audio data, in some embodiments. Filter 1120 may also filter or select different amounts of the stream of video communication data to send (e.g., audio only or lower amount of video data) even when not in a pause state (as some recipient devices may only receive portions of the stream of video communication data). Transmission/reception manager 330 may implement video communication data stream transport formatter 1130. Filtered data (or unfiltered data if full transmission is resumed) may then be formatted at video communication data stream transport formatter 1130 to be sent according to the established connection for the video communication. Various techniques for encoding, encrypting, compressing, and/or formatting the communication data as well as constructing messages, packets, or other transportation containers commensurate with communication protocol formats, such as real-time protocol (RTP) format, may be implemented to prepare the video communication data for transmission. The video communication data may then be transmitted 1106.

Figure 12:
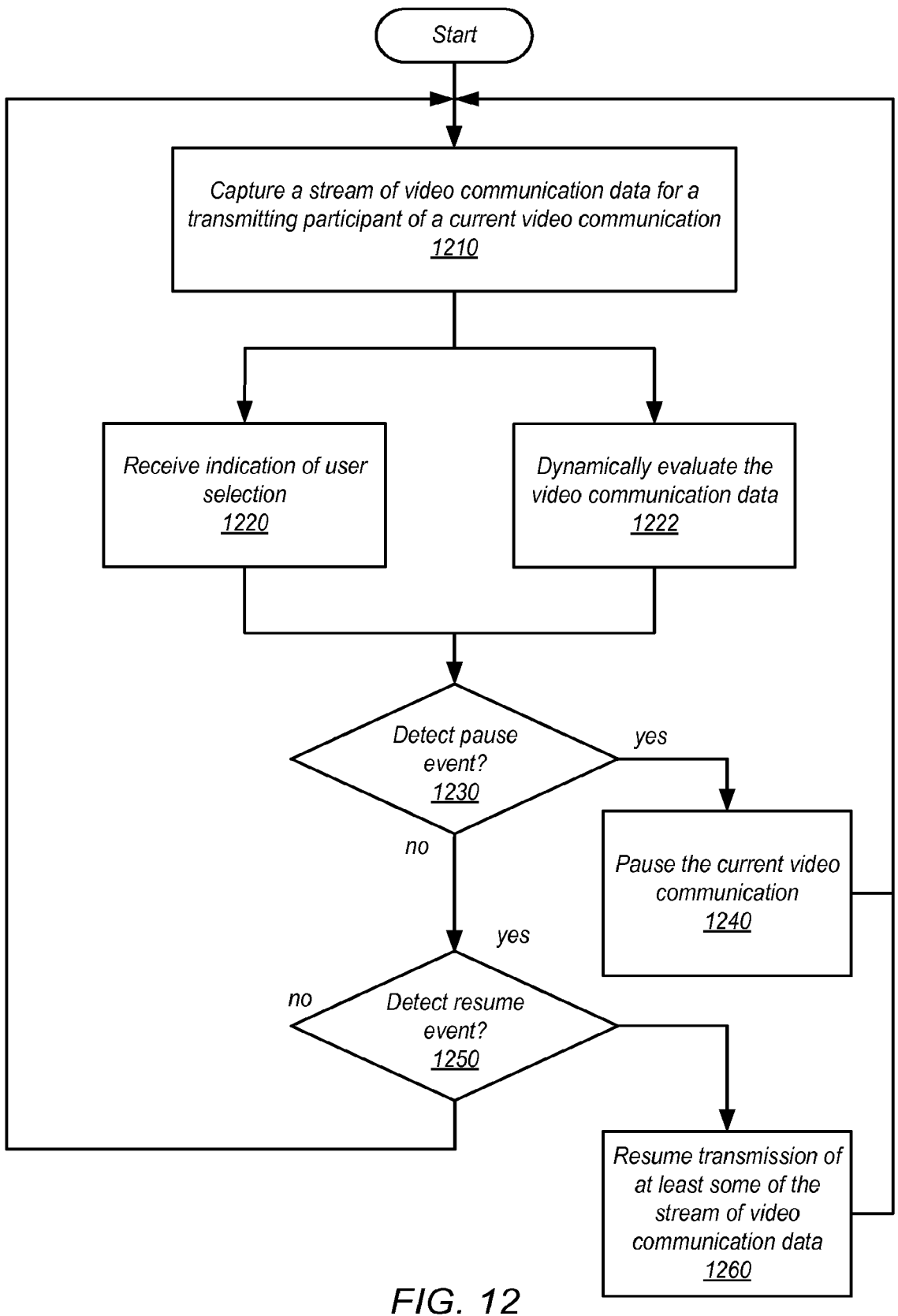
FIG. 12 is a high-level flowchart illustrating methods and techniques for dynamically detecting pause or resume events for a video communication, according to some embodiments.

FIG. 12 is a high-level flowchart illustrating methods and techniques for dynamically detecting pause or resume events for a video communication, according to some embodiments. As indicated at 1210, a stream of video communication data may be captured for transmitting to a participant of a current video communication, in some embodiments. The capture of video communication data, as discussed above with regard to FIG. 3, may be performed by various optical and/or auditory sensors (e.g., cameras and/or microphones). The video communication may, in various embodiments, be peer-managed, as discussed above with regard to FIG. 1. As indicated at 1222, the stream of video communication data may be dynamically evaluated, in some embodiments. FIG. 13, discussed below, provides discussion of various evaluation techniques. For instance the video data and/or audio data within the video communication data may be analyzed, as well as various other input from other sensors or components. Based on the evaluation, a pause event may be detected, as indicated at 1230.

If a pause event is detected, as indicated by the positive exit of 1230, the video communication may be paused (for which at least some of the stream of capture video communication data is then not transmitted to a participant(s) in the video communication). Note, that in various embodiments, not all recipient devices that are participants in a video communication may receive the same amount of data. For instance, some participant devices may be more resource challenged (e.g., preventing the device from processing the entire stream of video communication data efficiently), than others. In another example, different users may have access or privilege to different amounts of the video communication data stream from the sending device, or a user of the sending device may wish to overlay graphic effects or other information to a particular recipient in multi-way video communication. Correspondingly, pausing the transmission of video communication data may reduce or halt transmission according to the respective amounts of the stream of video communication data that were transmitted originally. If, for instance, one recipient only receives audio data as part of the video communication and another recipient receives audio and video data, then in the event of a pause at the sending device, the first recipient may receive none of the stream of video communication data while the second recipient may receive only audio data. Alternatively, pausing may reduce all transmission of the stream of video communication data to a particular amount (or none at all) in some embodiments.

Alternatively, if the current transmission state for the video communication is paused, then a resume event may be detected, as indicated by the positive exit from 1250. Transmission of at least a portion stream of video communication data may be resumed or transmitted again, as indicated at 1260. For example, if in a pause state no data (or only audio data) is transmitted, upon detection of a resume event both audio and video data may be transmitted to the recipient participant. Again, as noted above, different recipients in a multi-way video communication may receive differing amounts of the stream of video communication data. When resuming transmission of at least a portion of the stream of video communication data, the amount of video communication data that was originally sent to a participant recipient may be resumed (e.g., if only audio was sent, and during a pause no data was sent, then at resume only audio may be sent). Circumstances for participants in a multi-way video communication may change during a pause state for a sending device. For instance, a recipient device that was resource challenged may no longer be resource challenged (and alternatively a recipient device may become resource challenged). Whatever the cause, upon resume, in some embodiments different amounts of the stream of video communication data than were originally sent prior to the pause may be sent to recipient devices.

In some embodiments, manual input for pause and resume events may be received. As indicated at 1220, indication of a user selection of a transmissions state for the video communication may be received. For instance, a user interface element may be selected, touch input, audio input, or some other form of input may be received and interpreted to correspond to pausing or resuming the video communication.

Dynamic detection of pause and resume events may be beneficial when operating multi-way video communications and/or displaying video communication data in integrated display mode. When, for instance, multiple different participants are transmitting and receiving video communication data for a video communication, dynamic pausing of the video communication data may lessen the computational burden on the transmitting and receiving participant devices. Similarly, the automated or dynamic nature of detecting pause and resume events may prevent a user from manually pausing and resuming transmission when operating other applications at the same time as the video communication (as may be the case in integrated display mode).

FIG. 13 is a high-level flowchart illustrating methods and techniques for determining an active exchange indicator of a video communication, according to some embodiments. As discussed above, video communication data may be captured 1300 for transmission. Video data may be analyzed 1310, in various embodiments. For example, facial recognition techniques may be performed to identify whether or not a person is in view of the participant device. Other forms of video analysis may be employed. For instance, light levels may be determined, or an amount of motion may be detected. As indicated at 1312 audio data may be analyzed, in some embodiments. Speech analysis may be employed to detect an amount of conversation or speech. Background noise or other audio signals may also be evaluated or recognized (and ignored). For example, it may be determined that ongoing speech is not directed to other participants of the video communication. Other sensor input 1314 may also be analyzed. For instance, orientation sensors, such as included in portable multi-function device 3000 described below with regard to FIG. 22, may be used to detect motion of the participant device. In some embodiments, other sensor input 1314 may indicate whether another participant device linked to a same user account as the device transmitting data is also transmitting video communication data and/or whether the other participant device linked to the same user account is in proximity to the device. If it may be determined based on analyzing audio or video data received from the other device, that a user is instead using the other device to participate in the video communication, then it may indicate whether or not to pause video communication at the device. For example, if a mobile phone and a tablet computer are both linked to the same user account, and both devices are participating in a video communication, then a pause event may be detected on one of the devices (e.g., the tablet computer) based on the active exchange of information determined at the mobile phone and/or based on the proximity of the mobile phone to the tablet computer.

As indicated at 1320, in some embodiments a determination of an active exchange indicator may be made. For example, a weighting scheme for various different determinations made at elements 1310, 1312, and 1314 may be implemented, in some embodiments. A face that is recognized within the view of the participant device may weighted as more likely to indicate active exchange of information if combined with particular amounts of detected speech. Other user-provided information may be considered when determining an active exchange indicator. For instance, if no face is recognized, but an it is also known that an outward facing camera is selected (one which would not be pointed at a user but pointed so as to show a recipient something that is not the user), then the lack of facial recognition may be negated. Thus, in various embodiments the source or specific devices capturing the stream of video communication data may be considered when evaluating the data stream to detect pause and resume events.

Once the active exchange indicator is determined, the active exchange indicator may be compared with a particular exchange threshold. Whether a resume event or a pause event it is triggered may depend on the current transmission state of the video communication. As indicated by the negative exit at 1330, if the current transmission state is not paused, then the active exchange indicator may be compared with an exchange threshold. If the active exchange indicator is below the exchange threshold, as indicated by the positive exit from 1340, then a pause event may be triggered, as indicated 1350. If not, as indicated by the negative exit from 1340, then more data may be captured 1300 and the analysis performed again. As indicated by the positive exit from 1330, a comparison between the active exchange indicator and whether it is above the exchange threshold, as indicated at 1360, may be made. If the active exchange indicator is above the exchange threshold, as indicated by the positive exit from 1360, then a resume event may be triggered. If not, then as indicated by the negative exit from 1360, then more data may be captured 1300 and the analysis performed again.

Figure 14:
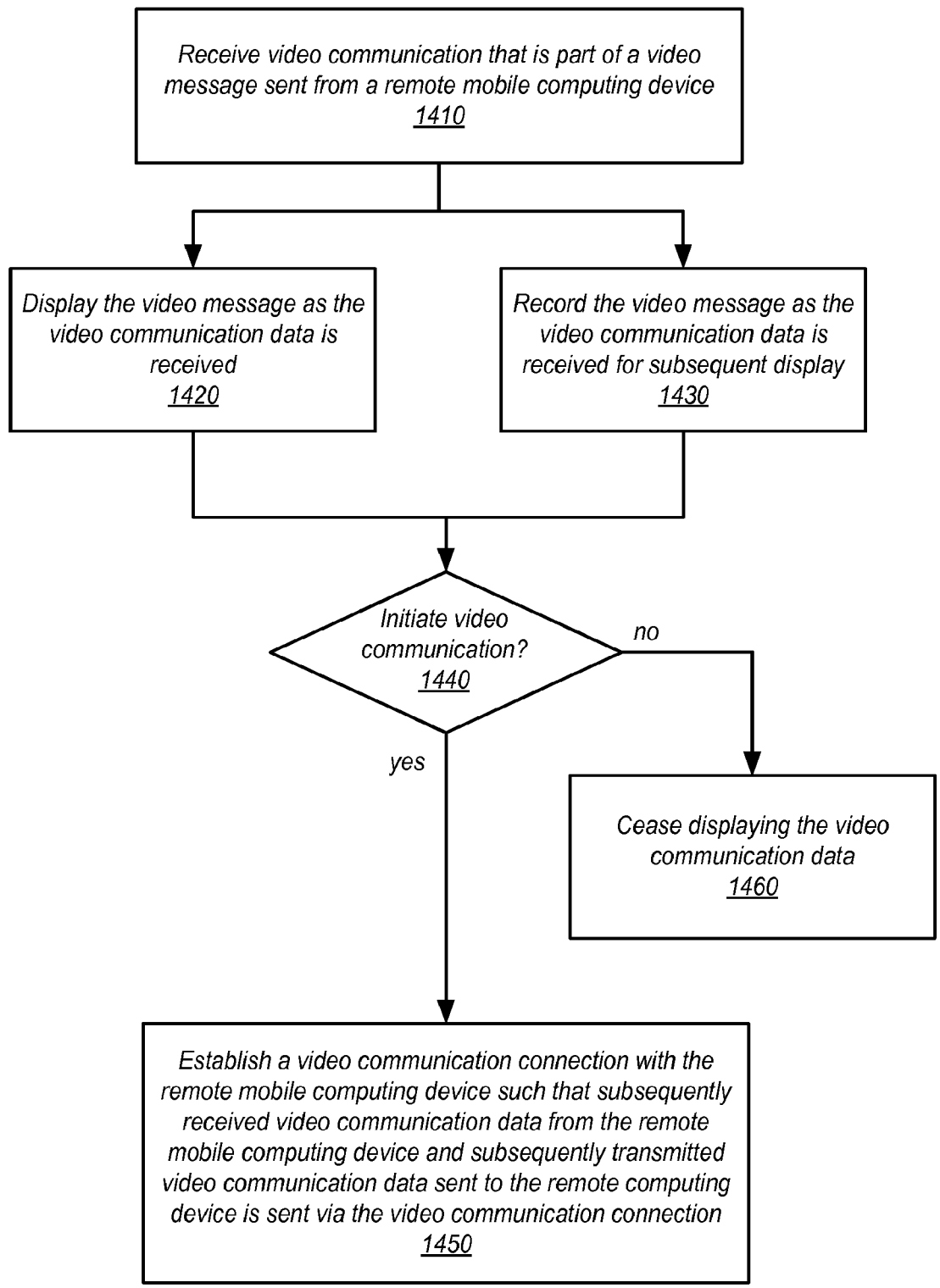
FIG. 14 is a high-level flowchart illustrating methods and techniques for a dynamic transition from a video message to a video communication, according to some embodiments.

Initiating a video communication typically involves both an initiating device and a recipient device. A video connection may be established if the recipient accepts video communication. As video communication becomes more common, more entities unknown to a recipient may request a video communication, or more video communications even between known parties may be sought. However, video communications may not always desirable, unless it can be ascertained as to the subject of the communication. Instead of initiating a video communication, a video message may be sent to a recipient, which can be replayed to ascertain the nature of the video communication. If it is desirable, the recipient device can initiate a dynamic transition of the video message into a video communication. FIG. 14 is a high-level flowchart illustrating methods and techniques for a dynamic transition from a video message to a video communication, according to some embodiments.

As indicated at 1410, video communication data may be received via a video messaging protocol from a remote mobile computing device that is part of a video message from the remote mobile computing device, in various embodiments. For example, video communication data may be sent and/or received via a multi-media messaging (MMS) protocol (which may be partially carried over a different network, such as a wireless telephone network, than the wide area network for which video communications may be transmitted). Alternatively, video communication data of a video message may be sent via an instant messaging or chat protocol.

As the video communication data of the video message is received, the video message may be displayed on an electronic display at the recipient device, as indicated at 1420. For example, the video message may be displayed at the recipient device in near real-time, which may "pop up" or automatically be displayed—even if another application is currently displaying or controlling the electronic display or if the electronic display is "asleep" or not active, similar to the integration display mode discussed above. The video message may also be recorded for subsequent display at the recipient device, as indicated at 1430. For instance, the video communication data for the video message may be stored at local storage on the recipient storage device. In various embodiments, the video communication data may be recorded in a lesser quality or different version (such as may be achieved by a different video encoding like open format encoding) than the quality or version of the data as it is received.

In at least some embodiments, an indication to initiate a video communication with the remote mobile computing device may be received, as indicated by the positive exit from 1440. In various embodiments, a user selection of a user interface element or some other form of input received at the recipient device may indicate that the video communication is to be initiated. For instance, a touch gesture, such as tapping the displayed video message on a touch-sensitive electronic display, may indicate the desire to initiate a video communication.

In response to receiving the indication to initiate the video communication, a video communication connection may be established with the remote mobile computing device, as indicate at 1450, in various embodiments. For instance, various handshake messages or other credential exchanges may be performed in order to establish the connection. Subsequently received video communication data may then be received via the established video communication connection which may be different than the video messaging protocol. For example, the video communication may be performed via a peer-to-peer and/or peer-managed implementation of a video transport protocol, such as real-time transport protocol (RTP). Additionally, video communication data may be captured and transmitted from the recipient device to the remote mobile computing device via the established connection (as may be performed as part of a two or multi-way video communication). In at least some embodiments, the video communication data received one the video communication connection is established may continue to be recorded and stored along with the video communication data received via the video messaging protocol for subsequent playback.

In at least some embodiments, though the video communication connection is established and may allow real-time communication, captured video communication data may still be exchanged as a message via the established video communication channel. For instance, a user may indicate in the selection to establish a video communication connection that the conversation may still occur "offline" (i.e., by sending and receiving video messages). Exchanged video messages may be sent via the established connection (and according to is various protocol requirements). Moreover, indications may be received to switch between an offline conversation and a real-time conversation with the video communication connection already established. In some embodiments, however, the way in which "offline" video messages may be transmitted may be determined based on a cost or responsiveness determination. For instance, if resources used to establish the video communication connection may be used for other purposes, then the video communication may be relinquished and video messages exchanged via the video messaging protocol.

In at least some embodiments, no indication may be received to initiate the video communication, or a negative indication to not initiate the video communication may be received, as indicated by the negative exit from 1440. This indication may, in some embodiments indicate a desire to cease displaying the video communication data as it is received, as indicated at 1460. For example, a touch gesture, such as swiping away the displayed video message on a touch-sensitive electronic display, may indicate the desire to cease display of the video communication data (and not initiate a video communication). Recording of the video message, however, may continue. In some embodiments, the stored video communication data of the recording may be subsequently displayed, in response to a playback request. Although not illustrated, in some embodiments, an indication may be subsequently received to establish a video communication (after initially receiving an indication not to display the video communication). For instance, a voice command may be detected to instruct the display and establishment of a video communication with the sending device who sent (or is still sending) the video message.

Figure 15:
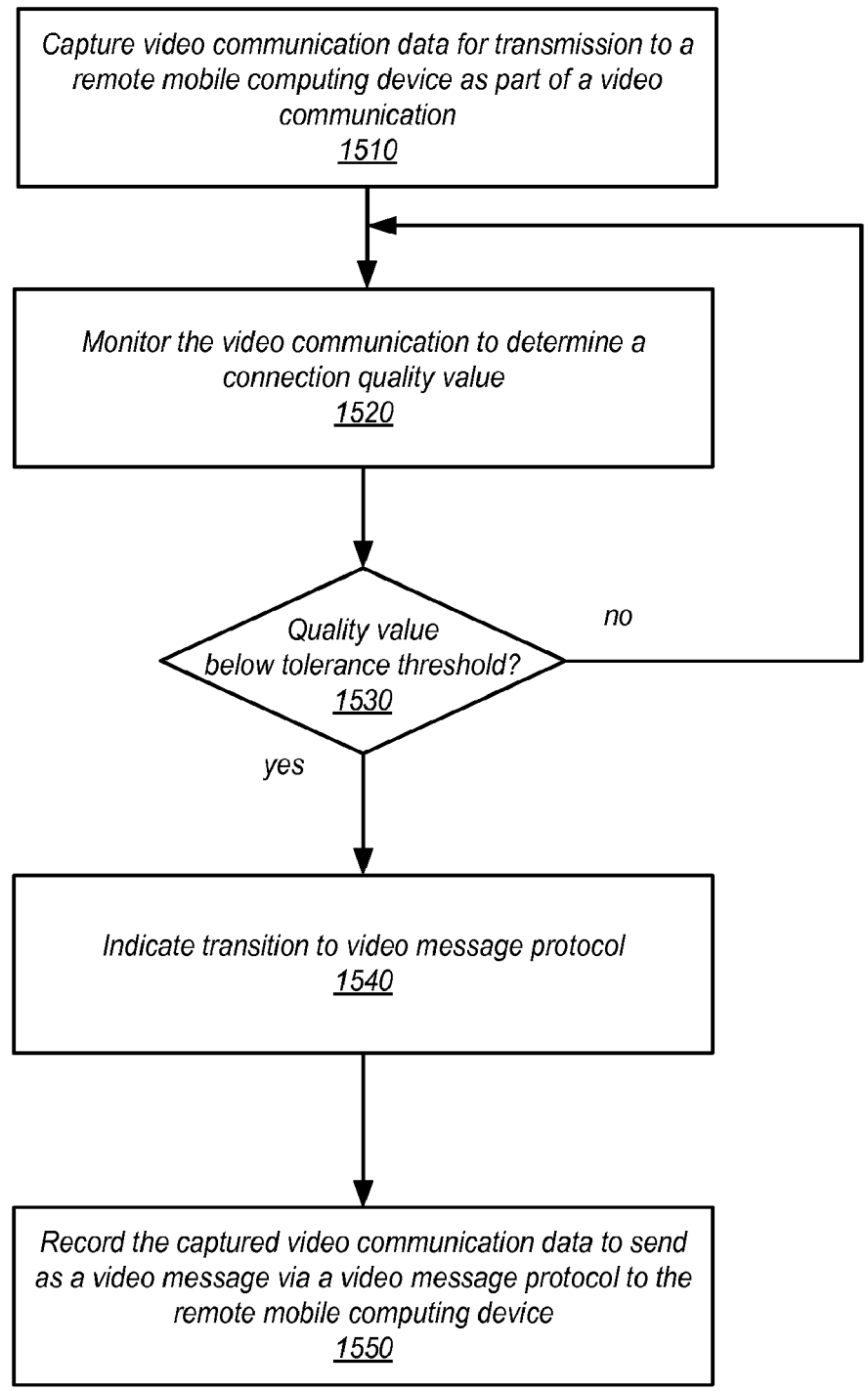
FIG. 15 is a high-level flowchart illustrating methods and techniques for monitoring the quality of video communication connections for dynamic transitions between video communications and video messages, according to some embodiments.
Figure 16:
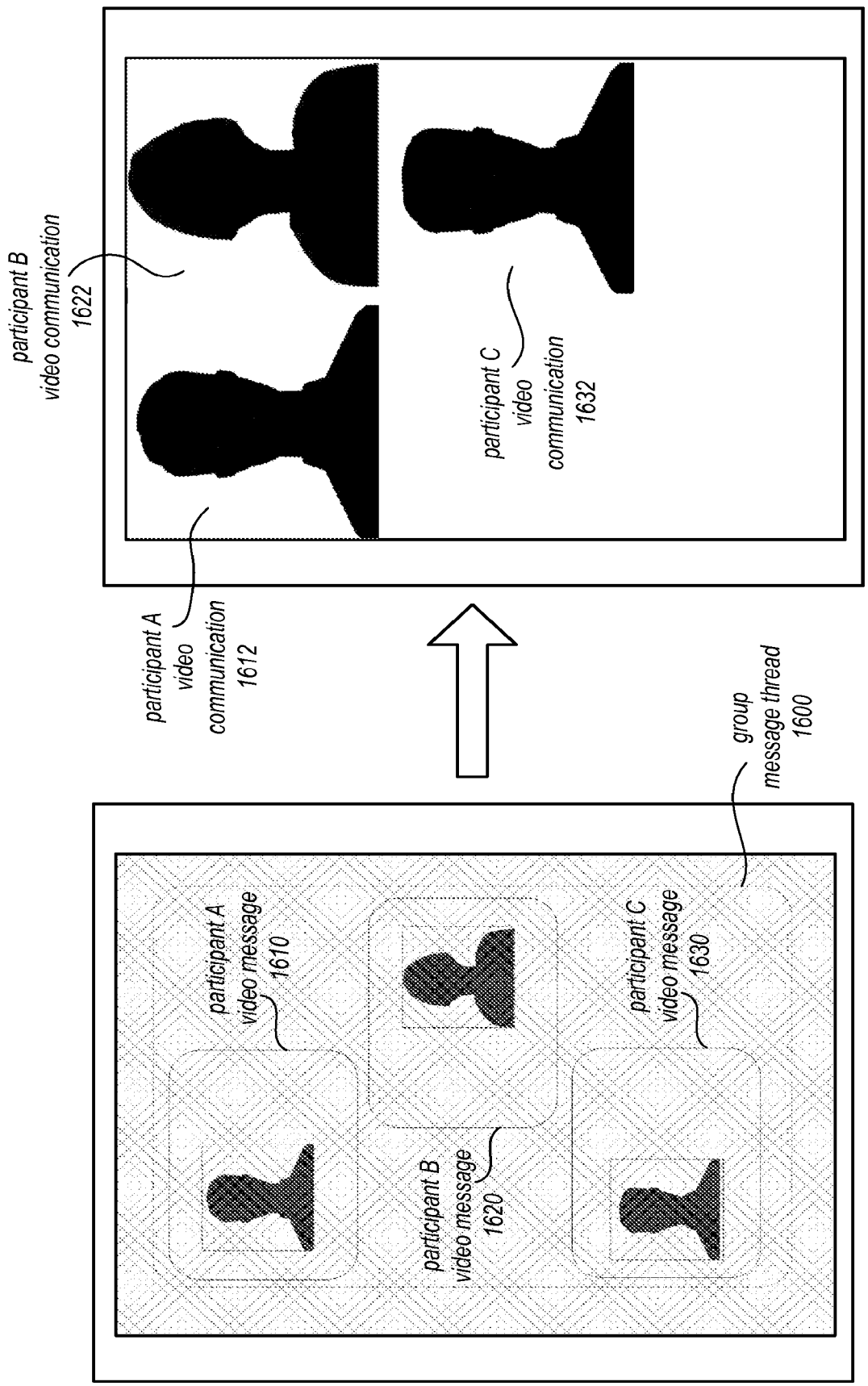
FIGS. 16A and 16B illustrate a dynamic transition for multiple participants in a video message to a video communication, according to some embodiments.

The transition between a video message communication, which is unilateral or one-way, into a two-way or multi-way video communication may also be employed to handle network changes that may make the video communication unsustainable (e.g., due to poor network connection quality). FIG. 15 is a high-level flowchart illustrating methods and techniques for monitoring the quality of video communication connection for dynamic transitions between video communications and video messages, according to some embodiments. As indicated at 1510, video communication data may be captured for transmission to a remote mobile computing device as part of a video communication. The captured video communication data may be sent via an established connection to one or more remote mobile computing devices. As indicated at 1520, the video communication may be monitored to determine a connection quality indicator. For example, various signal strength metrics (for wireless connections) or network performance metrics (e.g., available bandwidth or connection speed) may be used to determine the connection quality indicator.

If the video communication maintains a connection quality indicator at or above a certain tolerance threshold, then the video communication may continue, as indicated by the negative exit from 1530. However, in various embodiments if the connection quality indicator falls below the tolerance threshold, then a transition to video message protocol may be made. For example, as indicated by the positive exit from 1530, an indication of transition to video message protocol may be provided, as indicate at 1540. This indication may, in various embodiments, be an alert, notification, message or information display at the transmitting participant device. In some embodiments, a notification or other indication may also be provided to other participant(s) in the video communication that the particular participant device has switched to a video message protocol. As indicated at 1550, the captured video communication data may be recorded to send as a video message via the video messaging protocol to the remote mobile computing device. Although not illustrated, a reverse transition may be made if, for example, the connection quality indicator meets or rises above the tolerance threshold, then captured video communication data may be sent again via the established video communication connection, in at least some embodiments. For example, in some embodiments it may be determined that the connection quality indicator equals or is above the connection tolerance threshold, and in response the transmission of captured video communication data may be resumed via the video communication connection.

Although previously discussed in the context of receiving a video message to initiate a two-way video communication, the same techniques may be applied for larger groups of participant devices. For example, multiple participant devices communicating via a group message thread or video chat thread may implement the above techniques. FIGS. 16A and 16B illustrate a dynamic transition for multiple participants in a video message to a video communication, according to some embodiments. FIG. 16A illustrates a group message thread 1600. Different participants in the group message thread 1600 may send/post different video messages, such as participant A video message 1610, participant B video message 1620, and participant C video message 1630. The video messages may be displayed as they are received. Moreover, as discussed above with regard to FIG. 14, an indication to initiate a video communication may be received, such as touch input on one or more of the video messages 1610, 1620, and/or 1630. FIG. 16B illustrates a dynamic transition to a video communication with participants of the group message thread 1600. Video communication data for participant A 1612, video communication data for participant B 1622, and video communication data for participant C 1632 may be displayed as part of a multi-way video communication. Please note, that although all participants are illustrated as participating in the multi-way communication, not all group message thread participants need or accept participation in a live video communication. For those participants that do not participate, video messages containing the communication data may be transmitted or posted to the group message thread, in some embodiments. In this way, some participants of a group message thread may passively participate in the group communication. Participants that later join either the group chat, message thread, or multi-way video communication may also receive (and possibly display) prior video communications or messages for the group communication (e.g., replaying the history of the conversation), in some embodiments.

As noted above with regard to FIG. 14, in various embodiments video communication data may be recorded, whether transmitted via the video messaging protocol or the video communication connection. In some embodiments, the communication data may be stored locally at each participant's device. However, large amounts of video communication data may exceed local storage resources. The video communication data may thus be stored in a different (e.g., lower resolution) format. In some embodiments, video communication data may be stored at a remote storage device or data store, such as discussed above with regard to stored video communication data 360 in FIG. 3.

Various privacy safeguards and protocols may be implemented, however, for any video communication data that is remotely stored. For example, consent to record video communications remotely (or locally on other participant devices) may have to be explicitly obtained (e.g., a confirmation dialogue interface element may have to be selected or approved). The video communication data may be encrypted such that only participants in the video communication may be able to access the stored video communication data. In some embodiments, strict data retention policies may be implemented such as to remove the stored communication data after a short period of time (e.g., 24 hours or 3 days). Current consent from the participants may be required for each access of the stored video communication data by another participant. Alternatively, in some embodiments, participant devices may be able to stream or send stored video communication data that may only be stored at the one participant device. For example, each participant device may retain only that the video communication data captured at the participant device, bypassing any remote storage at all for the video communication.

Figure 17:
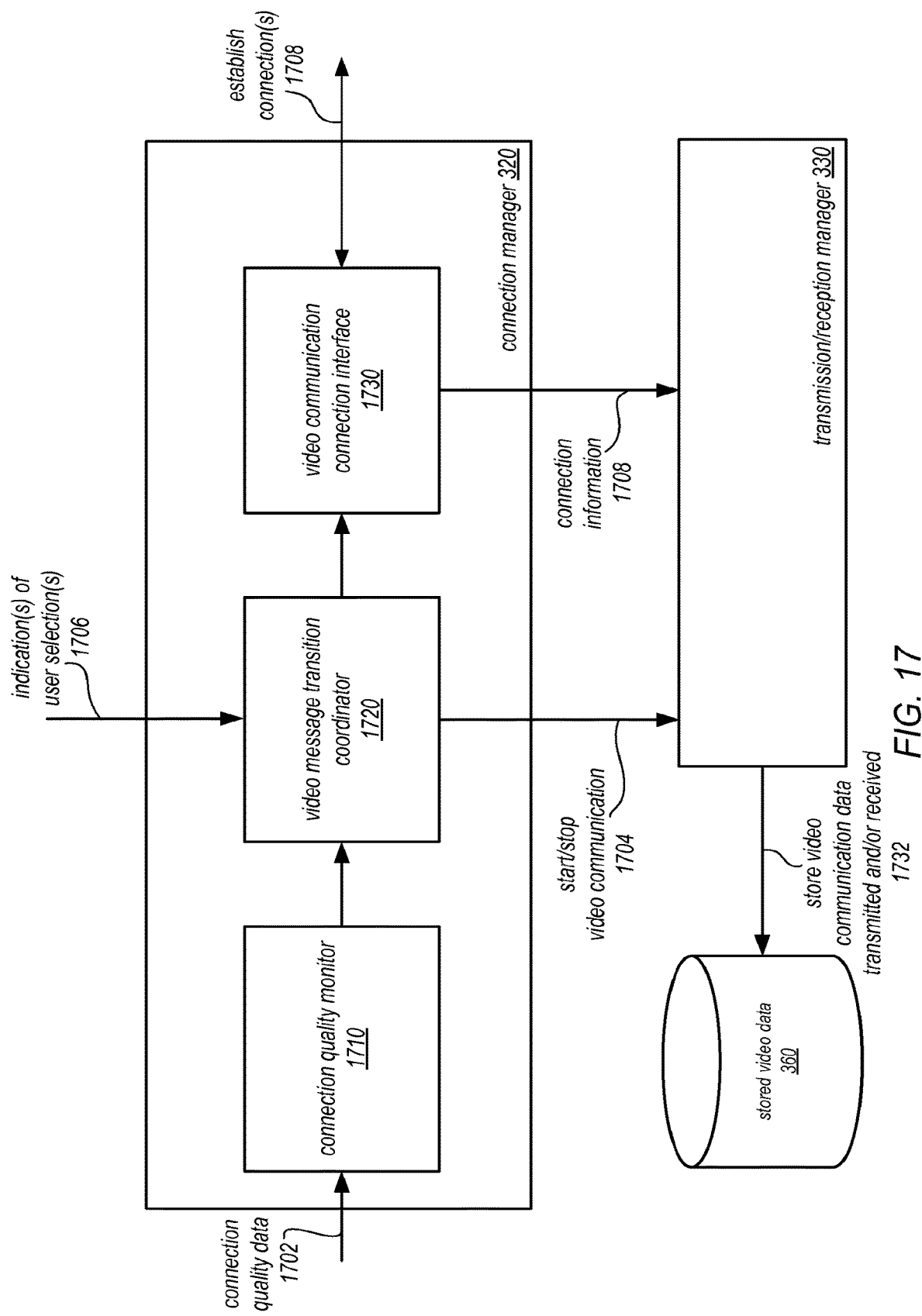
FIG. 17 is a block diagram illustrating a connection manager of a video communication module implementing dynamic transitions between video communications and video messages, according to some embodiments.

FIG. 17 is a block diagram illustrating a connection manager of a video communication module implementing dynamic transitions between video communications and video messages, according to some embodiments. Connection manager 320 may implement a video message transition coordinator 1720, which may be configured to direct the various steps necessary to transition between a video message and a video communication. For instance, start or stop commands 1704 for video communications may be sent to transmission/reception manager 330, to start or stop the video communication. Similarly, video message transition coordinator may request that another application, such as an application, module or component responsible for implementing video messaging (e.g., instant messaging module 3041 in portable multi-function device 3000 in FIG. 22) to handle video communication data as a video message (e.g., such as in the event video connection quality falls below a threshold). Video message transaction coordinator may determine when transitions between video messaging and video communication occur based on various inputs. For example, an indication or a user selection 1706 to initiate a video communication for a currently displayed video message may be received, which video message transition coordinator may rely upon to initiate a transition to a video communication.

Connection manager 320 may also implement connection quality monitor 1710 which may be configured to perform the various techniques described above with regard to FIG. 15, in order to evaluate connection quality data 1702 and determine when transition to and from video messaging may be performed. Connection quality monitor 1710 may also provide input to video message transaction coordinator to indicate when such transitions may need to be performed.

Connection manger 320 may also implement video connection interface 1730. Video connection interface 1730 may establish connections 1708 with remote mobile computing devices in order to transition to video communications. Connection information 1708 may be provided to transmission/reception manager 330, or other similar component responsible for transmitting capture video communication data via the established connection(s) 1708.

Transmission reception manager 330 may record/store video communication data that is transmitted and/or received 1732 in stored video data 360. Stored video data 360 may be a local persistent data store, or more may be a remote data store (e.g., single remote device or distributed system) storing the video communication data at one or across multiple storage servers or locations.

Figure 18:
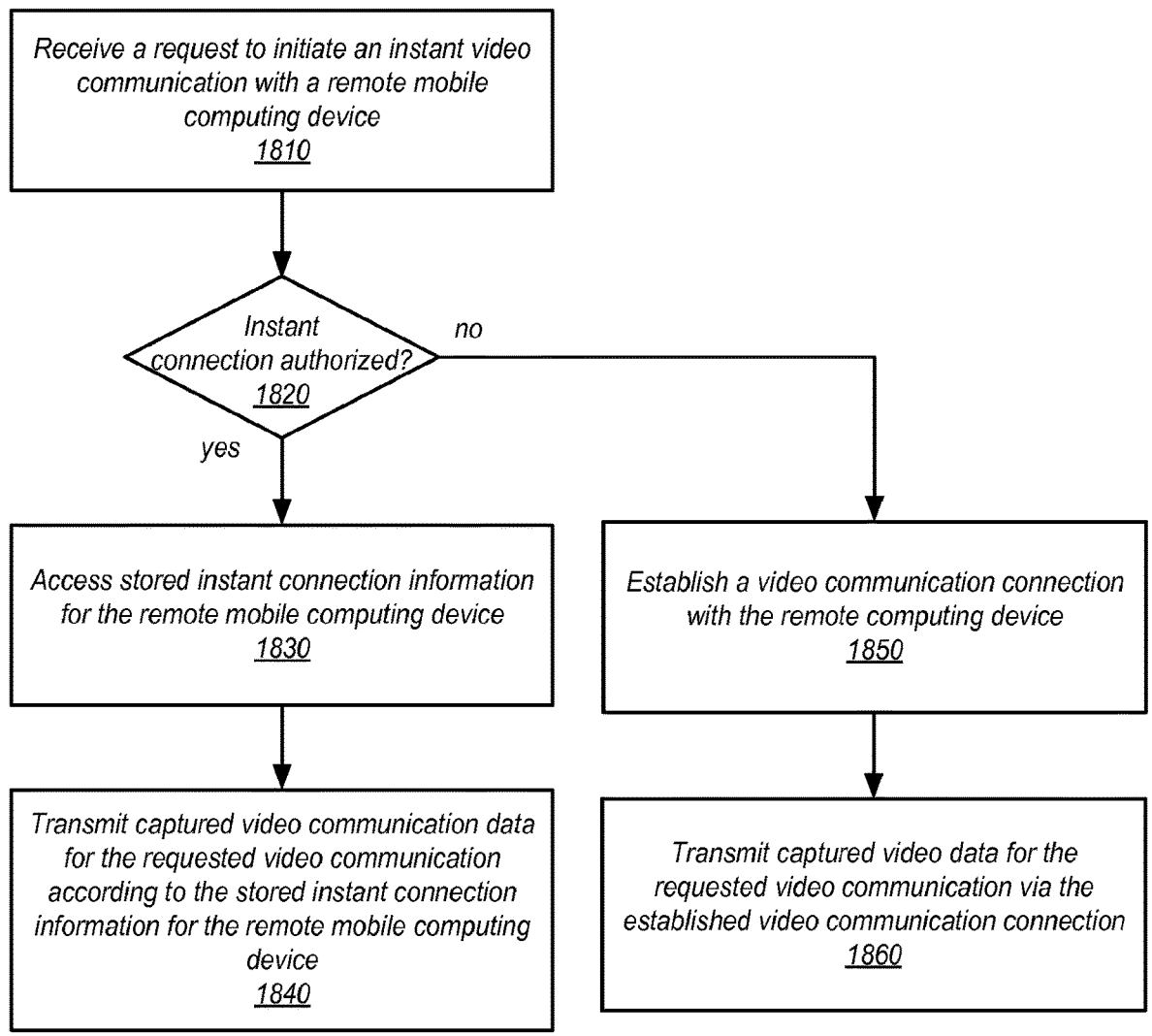
FIG. 18 is a high-level flowchart illustrating methods and techniques for instant video communications, according to some embodiments.

Another technique for increasing the ease and flexibility of performing video communications may involve reducing the amount of time it takes establish video communications. FIG. 18 is a high-level flowchart illustrating methods and techniques for instant video communications, according to some embodiments. Instant video communications may be implemented based on pre-established video communication connections that are maintained for different participant devices. Each participant device may manage a list of authorized participant devices from which instant video communications may be received or to which instant video communications may be sent. Please note that the term instant may refer to the transmission time of video communication data between participant devices without having to performing certain connection establishment techniques prior to transmitting the video communication data. Thus an "instant" video communication may be a video communication connection for which previously performed connection establishments steps have been performed so that transmission of video communication data may begin (from the perspective of users of participant devices) "instantly," in various embodiments, without performing steps to establish the connection. Therefore the term instant may not be construed as requiring absolutely instantaneous communication.

As indicated at 1810, a request may be received to initiate an instant video communication with a remote mobile computing device. For example, some remote mobile computing devices for which instant communication is enabled/authorized may by default initiate a request for an instant video communication when a video communication for one of those mobile computing devices is requested. In response to receipt of the request, a determination may be made as to whether the instant connection is authorized for the particular user, as indicated at 1820. For example, a list, other organizational scheme may be applied to stored participant connection information, with certain participants designated as authorized for instant connections. If the participant device is on the authorization list, then the instant video connection may be considered authorized.

If authorized, as indicated by the positive exit from 1820, stored connection information for the remote mobile computing device may be accessed, as indicated at 1830. This stored connection information may be maintained or updated in various embodiments to ensure that the connection with the remote mobile computing device is successfully maintained, in various embodiments. For example, a heartbeat or other polling technique may periodically or aperiodically send confirmation or reauthorization requests to the remote mobile computing device to obtain updated connection information or verify connection information. In some embodiments, the remote mobile computing device may proactively send updates to participant devices for which it maintains authorization for instant video communications to update or verify connection information. The maintained connection information may be various identifiers, keys, credentials, tokens, addresses, or any other information necessary to transmit video communication data via the video communication connection that has been previously authorized and established.

Figure 20:
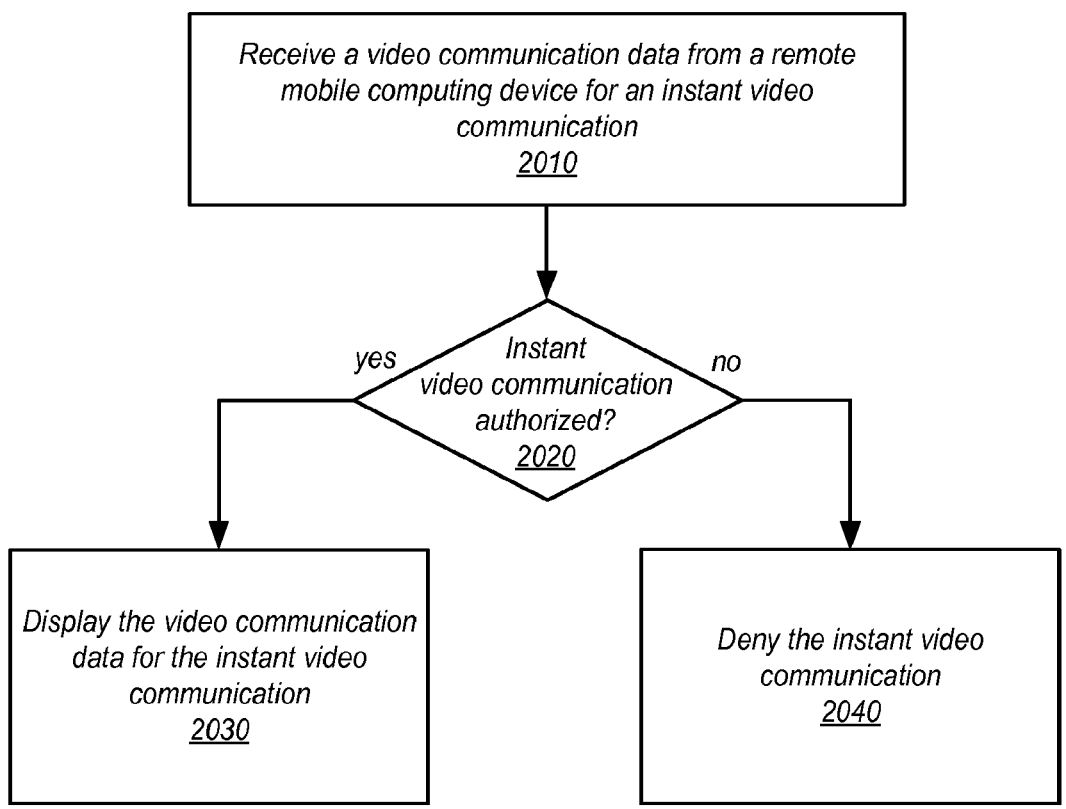
FIG. 20 is a high-level flow chart illustrating methods and techniques for display video communication data via an instant video communication connection, according to some embodiments.

As indicated at 1840, video communication data captured for the instant video communication may be transmitted according to the stored instant connection for the remote mobile computing device, in various embodiments. In this way, the communication data may be quickly received and displayed at the remote mobile computing device, providing a near real-time experience of video communication for users of the mobile computing device. FIG. 20 described below provides further detail concerning displaying video communication data for instant video communications. If an instant connection is not authorized, as indicated by the negative exit from 1820, then a video communication connection may first be established with the remote computing device, as indicated at 1850. For example, various identification and authentication exchanges both with the remote mobile computing device and/or other third-party systems, such as credentialing or identification systems, to facilitate video communication with the remote mobile computing may be performed. After establishing the video communication connection, then video communication data captured for the video communication may be transmitted according to the established video communication connection, as indicated at 1860.

Figure 19A:
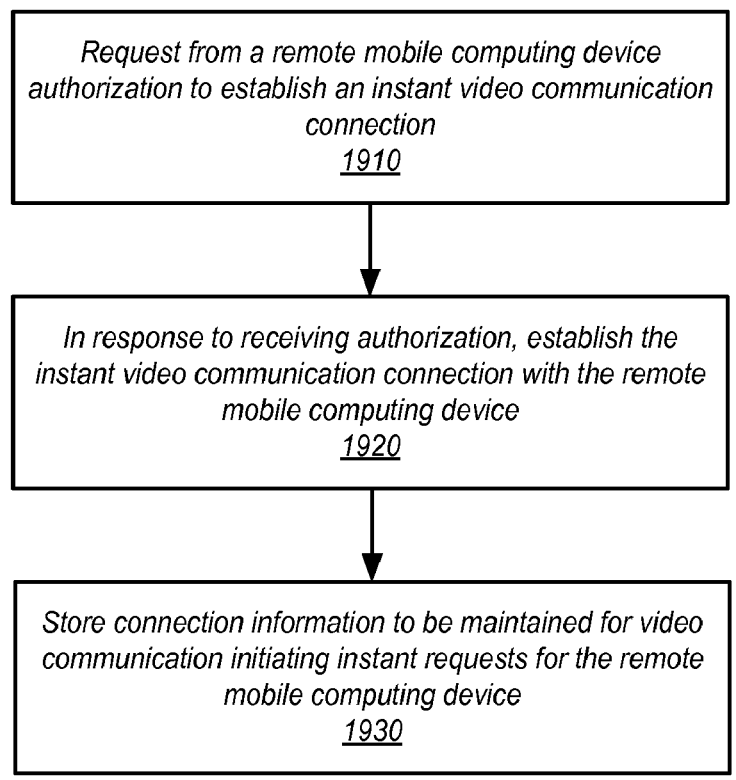
FIGS. 19A and 19B are high-level flow charts illustrating methods and techniques for obtaining authorization to establish instant video communication connections, according to some embodiments.
Figure 19B:
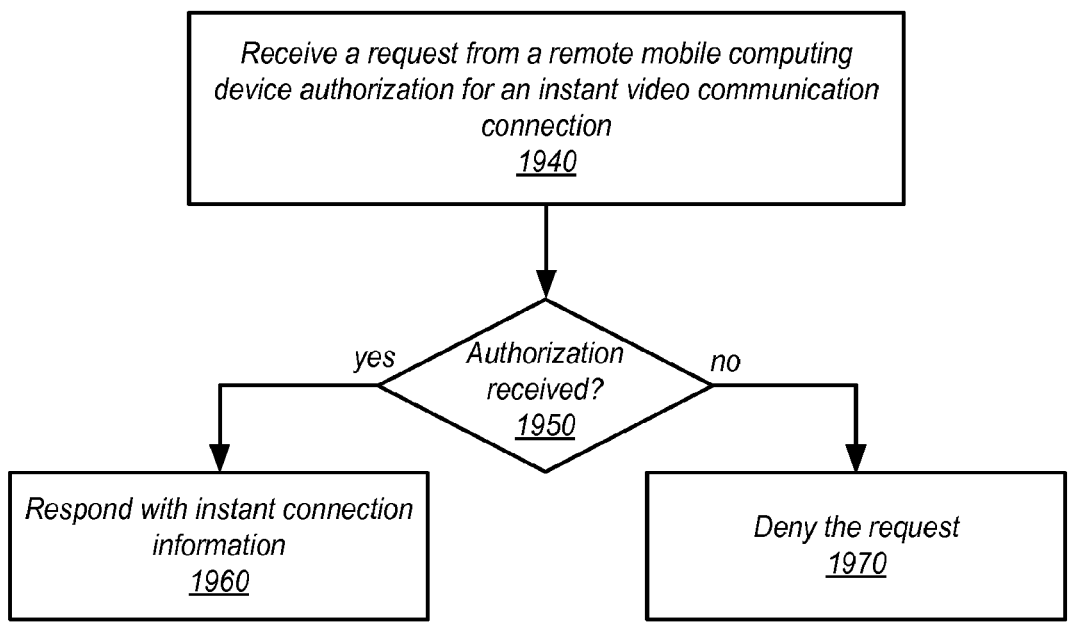

FIGS. 19A and 19B are high-level flow charts illustrating methods and techniques for obtaining authorization to establish instant video communication connections, according to some embodiments. FIG. 19A illustrates establishing instant video communication authorization from a requesting participant device's perspective. As indicated at 1910, a request may be sent to a remote mobile computing device for authorization to establish an instant video communication connection. The request may provide various identification credentials of the requesting device, such as a user identifier, contact identifier or other information. As indicated at 1920, in response to receiving authorization, the instant video communication connection may be established with the remote mobile computing device, in various embodiments. For example, various identification and authentication exchanges both with the remote mobile computing device and/or other third-party systems, such as credentialing or identification systems, to facilitate video communication with the remote mobile computing may be performed. Once established, connection information for the instant video communication connection may be stored, as indicated at 1930, which may be subsequently accessed when initiating an instant video communication with the remote mobile computing device.

FIG. 19B illustrates techniques for establishing instant video communication connections from the perspective of remote mobile computing device or participant device's perspective that confirms or denies authorization for instant video communication. As indicated at 1940, a request may be received from a remote mobile computing device for authorization to establish an instant video communication connection. As noted above, the request may include various identification information. Based on this identification information, it may be determined whether authorization for the instant video communication connection is received, as indicated at 1950. For example, an indication or notification may be directed toward a user of the remote mobile computing device (e.g., displaying a notification or sending an email) identifying the requesting participant device (or user of the participant device) and requesting authorization to confirm or deny the instant connection authorization request. Confirmation input may be received, as indicated by the positive exit from 1950, and a response may be sent to the remote mobile computing device with connection information to establish the instant video communication connection, as indicated at 1960. In some embodiments, the receiving participant device may itself begin the establishment process for the instant video communication connection. If not authorized, then as indicated at 1970, the request for authorization may be denied.

FIG. 20 is a high-level flow chart illustrating methods and techniques for displaying video communication data via an instant video communication connection, according to some embodiments. As indicated at 2010 video communication data for an instant video communication may be received from a remote mobile computing device. Prior to displaying the video communication data, it may be determined whether instant video communication is authorized from this remote mobile computing device, as indicate at 2020. For instance, an authorized user/device list or contact information may be evaluated with respect to the particular remote mobile computing device. If the instant video communication is authorized, then video communication data for the instant video communication may be displayed, as indicated at 2030. In some embodiments, the video communication data may be displayed by default in integration display mode. While in some embodiments, full-screen display mode may be used to display the video communication data, such that the display location is dynamically determined. If the instant video communication is not authorized, then the instant video communication may be denied, as indicate at 2040. A denial may trigger a non-instant video communication establishment procedure at either remote mobile computing device and/or the recipient device, in some embodiments.

Figure 21:
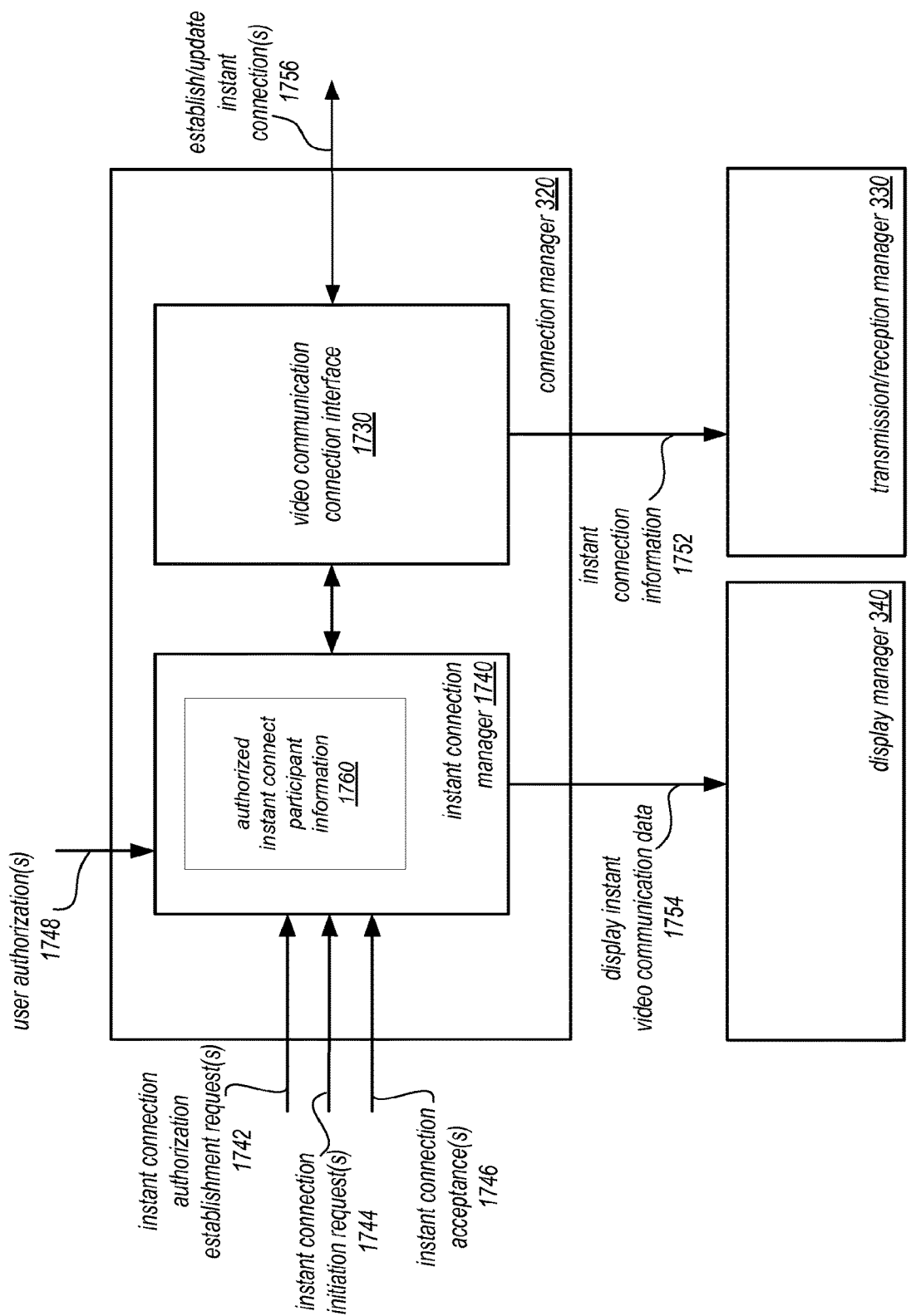
FIG. 21 is a block diagram illustrating a connection manager of a video communication module that implements instant video communications, according to some embodiments.

FIG. 21 is a block diagram illustrating a connection manager of a video communication module that implements instant video communications, according to some embodiments. Connection manager 320 may implement instant connection manager 1740, which may be configured to coordinate the authorization and performance of instant video communications, in various embodiments. Instant connection authorization establishment requests 1743, such as discussed above with regard to FIG. 19A, may be received at instant connection manager 1740, which solicit and/or receiving user authorization 1748 (or denial) for establishing instant video communications. For authorized instant video communications, instant connection manger 1740 may notify video communication interface 1730 to establish the instant video communication connection with the requesting mobile computing device. Connection information for the established instant video communication connection may be maintained by instant connection manager 1740 as part of authorized instant connection participant information 1760.

Similarly, when user authorization 1748 (or request for) instant connection to be established with a particular user or mobile computing device is received at instant connection manager 1740 (for which a request from that particular user or participant device has not been received), then instant connection manager 1740 may direct video communication connection interface 1730 to request authorization from the particular user or remote mobile computing device. Instant connection acceptance(s) 1746 may be received for these requests, and subsequently obtained connection information maintained as part of as part of authorized instant connect participant information 1760 (which may be maintained in participant contact information store 350 described above with regard to FIG. 3).

For requests to initiate an instant connection 1744, instant connection manager 1740 may determine whether such instant connections are authorized, and if so, direct video communication connection interface 1730 to provide the instant connection information 1752 to transmission/reception manger 330. Likewise for incoming instant video communications, instant connection manager 1740 may determine whether the incoming instant video communications are authorized, and direct display manager 340 to display the instant video communication data 1754.

The methods described herein may in various embodiments be implemented by any combination of hardware and software. For example, in one embodiment, the methods may be implemented by a mobile computing device, portable multi-function device (e.g., portable multi-function device 3000 in FIGS. 22-24) or computer system (e.g., a computer system 4000 in FIG. 25) that includes one or more processors executing program instructions stored on a computer-readable storage medium coupled to the processors. The program instructions may be configured to implement the functionality described herein (e.g., the functionality of various components that implement the video communication application described herein). The various methods as illustrated in the figures and described herein represent example embodiments of methods. The order of any method may be changed, and various elements may be added, reordered, combined, omitted, modified, etc.

Embodiments of electronic devices, user interfaces for such devices, and associated processes for using such devices are described. In some embodiments, the device is a portable communications device, such as a mobile telephone, that also contains other functions, such as PDA and/or music player functions. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 22:
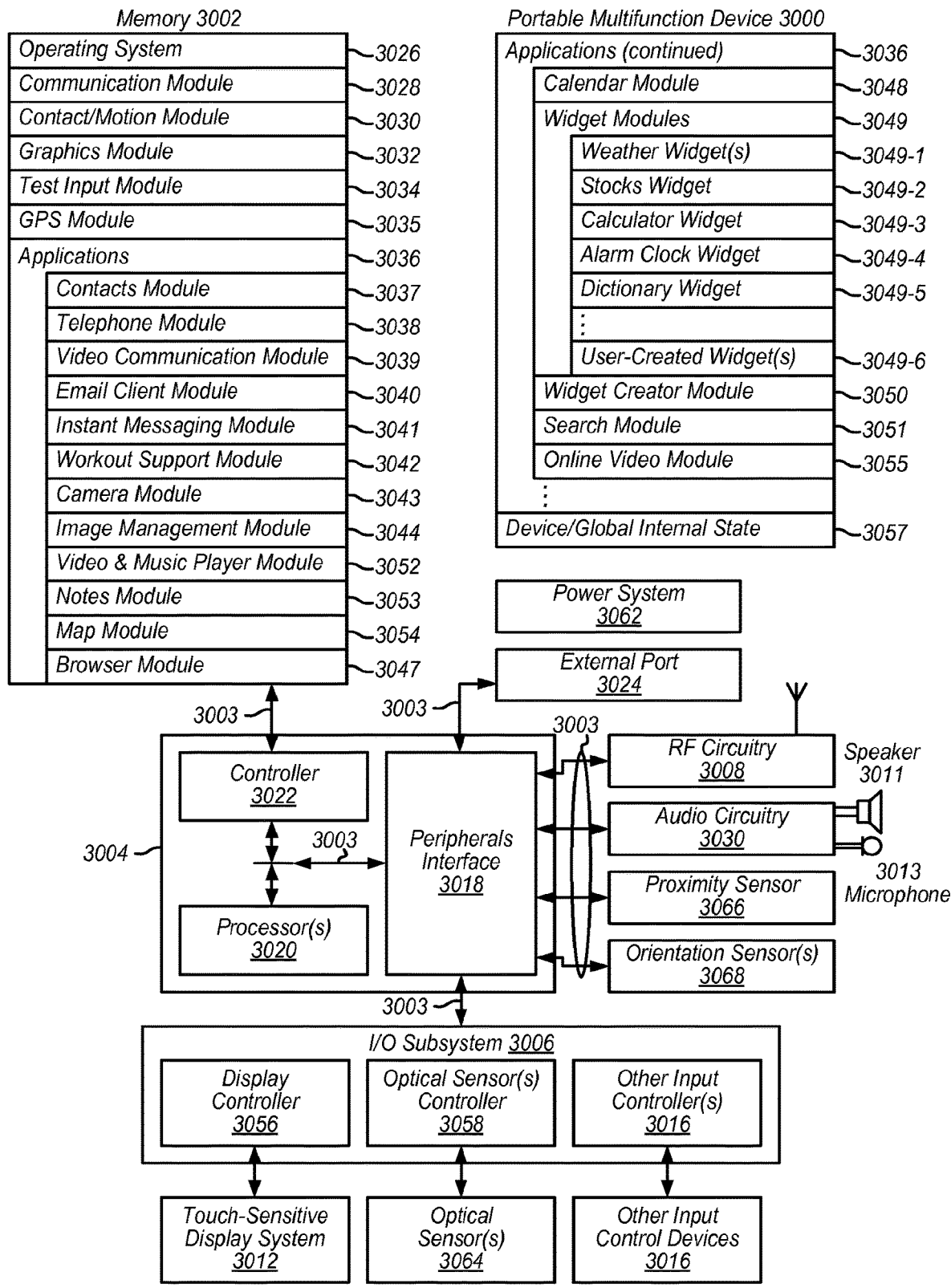
FIGS. 22-24 are block diagrams illustrating an example portable multi-function computing device, according to some embodiments.

Attention is now directed toward embodiments of portable devices with touch-sensitive displays. FIG. 22 is a block diagram illustrating portable multifunction device 3000 with touch-sensitive displays 3012 in accordance with some embodiments. Touch-sensitive display 3012 is sometimes called a "touch screen" for convenience, and may also be known as or called a touch-sensitive display system. Device 3000 may include memory 3002 (which may include one or more computer readable storage mediums), memory controller 3022, one or more processing units (CPU's) 3020, peripherals interface 3018, RF circuitry 3008, audio circuitry 3010, speaker 3011, microphone 3013, input/output (I/O) subsystem 3006, other input or control devices 3016, and external port 3024. Device 3000 may include one or more optical sensors 3064. These components may communicate over one or more communication buses or signal lines 3003.

It should be appreciated that device 3000 is only one example of a portable multifunction device, and that device 3000 may have more or fewer components than shown, may combine two or more components, or may have a different configuration or arrangement of the components. The various components shown in FIG. 22 may be implemented in hardware, software, or a combination of both hardware and software, including one or more signal processing and/or application specific integrated circuits.

Memory 3002 may include high-speed random access memory and may also include non-volatile memory, such as one or more magnetic disk storage devices, flash memory devices, or other non-volatile solid-state memory devices. Access to memory 3002 by other components of device 3000, such as CPU 3020 and the peripherals interface 3018, may be controlled by memory controller 3022.

Peripherals interface 3018 can be used to couple input and output peripherals of the device to CPU 3020 and memory 3002. The one or more processors 3020 run or execute various software programs and/or sets of instructions stored in memory 3002 to perform various functions for device 3000 and to process data.

In some embodiments, peripherals interface 3018, CPU 3020, and memory controller 3022 may be implemented on a single chip, such as chip 3004. In some other embodiments, they may be implemented on separate chips.

RF (radio frequency) circuitry 3008 receives and sends RF signals, also called electromagnetic signals. RF circuitry 3008 converts electrical signals to/from electromagnetic signals and communicates with communications networks and other communications devices via the electromagnetic signals. RF circuitry 3008 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 3008 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of multiple communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 3010, speaker 3011, and microphone 3013 provide an audio interface between a user and device 3000. Audio circuitry 3010 receives audio data from peripherals interface 3018, converts the audio data to an electrical signal, and transmits the electrical signal to speaker 3011. Speaker 3011 converts the electrical signal to human-audible sound waves. Audio circuitry 3010 also receives electrical signals converted by microphone 3013 from sound waves. Audio circuitry 3010 converts the electrical signal to audio data and transmits the audio data to peripherals interface 3018 for processing. Audio data may be retrieved from and/or transmitted to memory 3002 and/or RF circuitry 3008 by peripherals interface 3018. In some embodiments, audio circuitry 3010 also includes a headset jack (e.g., 3212, FIG. 24). The headset jack provides an interface between audio circuitry 3010 and removable audio input/output peripherals, such as output-only headphones or a headset with both output (e.g., a headphone for one or both ears) and input (e.g., a microphone).

I/O subsystem 3006 couples input/output peripherals on device 3000, such as touch screen 3012 and other input control devices 3016, to peripherals interface 3018. I/O subsystem 3006 may include display controller 3056 and one or more input controllers 3060 for other input or control devices. The one or more input controllers 3060 receive/send electrical signals from/to other input or control devices 3016. The other input control devices 3016 may include physical buttons (e.g., push buttons, rocker buttons, etc.), dials, slider switches, joysticks, click wheels, and so forth. In some alternate embodiments, input controller(s) 3060 may be coupled to any (or none) of the following: a keyboard, infrared port, USB port, and a pointer device such as a mouse. The one or more buttons (e.g., 3208, FIG. 24) may include an up/down button for volume control of speaker 3011 and/or microphone 3013. The one or more buttons may include a push button (e.g., 3206, FIG. 22).

Touch-sensitive display 3012 provides an input interface and an output interface between the device and a user. Display controller 3056 receives and/or sends electrical signals from/to touch screen 3012. Touch screen 3012 displays visual output to the user. The visual output may include graphics, text, icons, video, and any combination thereof (collectively termed "graphics"). In some embodiments, some or all of the visual output may correspond to user-interface objects.

Touch screen 3012 has a touch-sensitive surface, sensor or set of sensors that accepts input from the user based on haptic and/or tactile contact. Touch screen 3012 and display controller 3056 (along with any associated modules and/or sets of instructions in memory 3002) detect contact (and any movement or breaking of the contact) on touch screen 3012 and converts the detected contact into interaction with user-interface objects (e.g., one or more soft keys, icons, web pages or images) that are displayed on touch screen 3012. In an exemplary embodiment, a point of contact between touch screen 3012 and the user corresponds to a finger of the user.

Touch screen 3012 may use LCD (liquid crystal display) technology, LPD (light emitting polymer display) technology, or LED (light emitting diode) technology, although other display technologies may be used in other embodiments. Touch screen 3012 and display controller 3056 may detect contact and any movement or breaking thereof using any of multiple touch sensing technologies now known or later developed, including but not limited to capacitive, resistive, infrared, and surface acoustic wave technologies, as well as other proximity sensor arrays or other elements for determining one or more points of contact with touch screen 3012.

Touch screen 3012 may have a video resolution in excess of 100 dpi. In some embodiments, the touch screen has a video resolution of approximately 1060 dpi. The user may make contact with touch screen 3012 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 3000 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 3012 or an extension of the touch-sensitive surface formed by the touch screen.

Device 3000 also includes power system 3062 for powering the various components. Power system 3062 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 3000 may also include one or more optical sensors 3064. FIG. 22 shows an optical sensor coupled to optical sensor controller 3058 in I/O subsystem 3006. Optical sensor 3064 may include charge-coupled device (CCD) or complementary metal-oxide semiconductor (CMOS) phototransistors. Optical sensor 3064 receives light from the environment, projected through one or more lens, and converts the light to data representing an image. In conjunction with imaging module 3043 (also called a camera module), optical sensor 3064 may capture still images or video. In some embodiments, an optical sensor is located on the back of device 3000, opposite touch screen display 3012 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 3000 may also include one or more proximity sensors 3066. FIG. 7 shows proximity sensor 3066 coupled to peripherals interface 3018. Alternately, proximity sensor 3066 may be coupled to input controller 3060 in I/O subsystem 3006. In some embodiments, the proximity sensor turns off and disables touch screen 3012 when the multifunction device is placed near the user's ear (e.g., when the user is making a phone call).

Device 3000 includes one or more orientation sensors 3068. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 3000. In some embodiments, the one or more orientation sensors include any combination of orientation/rotation sensors. FIG. 22 shows the one or more orientation sensors 3068 coupled to peripherals interface 3018. Alternately, the one or more orientation sensors 3068 may be coupled to an input controller 3060 in I/O subsystem 3006. In some embodiments, information is displayed on the touch screen display in a portrait view or a landscape view based on an analysis of data received from the one or more orientation sensors.

In some embodiments, the software components stored in memory 3002 include operating system 3026, communication module (or set of instructions) 3028, contact/motion module (or set of instructions) 3030, graphics module (or set of instructions) 3032, text input module (or set of instructions) 3034, Global Positioning System (GPS) module (or set of instructions) 3035, and applications (or sets of instructions) 3036. Furthermore, in some embodiments memory 3002 stores device/global internal state 3057, as shown in FIG. 22. Device/global internal state 3057 includes one or more of: active application state, indicating which applications, if any, are currently active; display state, indicating what applications, views or other information occupy various regions of touch screen display 3012; sensor state, including information obtained from the device's various sensors and input control devices 3016; and location information concerning the device's location and/or attitude.

Operating system 3026 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 3028 facilitates communication with other devices over one or more external ports 3024 and also includes various software components for handling data received by RF circuitry 3008 and/or external port 3024. External port 3024 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 3030 may detect contact with touch screen 3012 (in conjunction with display controller 3056) and other touch sensitive devices (e.g., a touchpad or physical click wheel). Contact/motion module 3030 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 3030 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 3030 and display controller 3056 detect contact on a touchpad.

Contact/motion module 3030 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 3032 includes various known software components for rendering and displaying graphics on touch screen 3012 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 3032 stores data representing graphics to be used. Each graphic may be assigned a corresponding code. Graphics module 3032 receives, from applications etc., one or more codes specifying graphics to be displayed along with, if necessary, coordinate data and other graphic property data, and then generates screen image data to output to display controller 3056.

Text input module 3034, which may be a component of graphics module 3032, provides soft keyboards for entering text in various applications (e.g., contacts 3037, e-mail 3040, IM 3041, browser 3047, and any other application that needs text input).

GPS module 3035 determines the location of the device and provides this information for use in various applications (e.g., to telephone 3038 for use in location-based dialing, to camera 3043 as picture/video metadata, and to applications that provide location-based services such as weather widgets, local yellow page widgets, and map/navigation widgets).

Applications 3036 may include the following modules (or sets of instructions), or a subset or superset thereof:
    contacts module 3037 (sometimes called an address book or contact list);
    telephone module 3038;
    video communication module 3039;
    e-mail client module 3040;

instant messaging (IM) module 3041;
workout support module 3042;
camera module 3043 for still and/or video images;
image management module 3044;
browser module 3047;
calendar module 3048;
widget modules 3049, which may include one or more of: weather widget 3049-1, stocks widget 3049-2, calculator widget 3049-3, alarm clock widget 3049-4, dictionary widget 3049-5, and other widgets obtained by the user, as well as user-created widgets 3049-6;
widget creator module 3050 for making user-created widgets 3049-6;
search module 3051;
video and music player module 3052, which may be made up of a video player
module and a music player module;
notes module 3053;
map module 3054; and/or
online video module 3055.

Examples of other applications 3036 that may be stored in memory 3002 include other word processing applications, other image editing applications, drawing applications, presentation applications, JAVA-enabled applications, encryption, digital rights management, voice recognition, and voice replication.

In conjunction with touch screen 3012, display controller 3056, contact module 3030, graphics module 3032, and text input module 3034, contacts module 3037 may be used to manage an address book or contact list (e.g., stored in application internal state 3092 of contacts module 3037 in memory 3002), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 3038, video conference 3039, e-mail 3040, or IM 3041; and so forth.

In conjunction with RF circuitry 3008, audio circuitry 3010, speaker 3011, microphone 3013, touch screen 3012, display controller 3056, contact module 3030, graphics module 3032, and text input module 3034, telephone module 3038 may be used to enter a sequence of characters corresponding to a telephone number, access one or more telephone numbers in address book 3037, modify a telephone number that has been entered, dial a respective telephone number, conduct a conversation and disconnect or hang up when the conversation is completed. As noted above, the wireless communication may use any of multiple communications standards, protocols and technologies.

In conjunction with RF circuitry 3008, audio circuitry 3010, speaker 3011, microphone 3013, touch screen 3012, display controller 3056, optical sensor 3064, optical sensor controller 3058, contact module 3030, graphics module 3032, text input module 3034, contact list 3037, and telephone module 3038, video communication module 3039 includes executable instructions to initiate, conduct, and terminate a video communication between a user and one or more other participants in accordance with user instructions, such as described above with regard to FIGS. 1-21.

In conjunction with RF circuitry 3008, touch screen 3012, display controller 3056, contact module 3030, graphics module 3032, and text input module 3034, e-mail client module 3040 includes executable instructions to create, send, receive, and manage e-mail in response to user instructions. In conjunction with image management module 3044, e-mail client module 3040 makes it very easy to create and send e-mails with still or video images taken with camera module 3043.

In conjunction with RF circuitry 3008, touch screen 3012, display controller 3056, contact module 3030, graphics module 3032, and text input module 3034, the instant messaging module 3041 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 3008, touch screen 3012, display controller 3056, contact module 3030, graphics module 3032, text input module 3034, GPS module 3035, map module 3054, and music player module 3046, workout support module 3042 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 3012, display controller 3056, optical sensor(s) 3064, optical sensor controller 3058, contact module 3030, graphics module 3032, and image management module 3044, camera module 3043 includes executable instructions to capture still images or video (including a video stream) and store them into memory 3002, modify characteristics of a still image or video, or delete a still image or video from memory 3002.

In conjunction with touch screen 3012, display controller 3056, contact module 3030, graphics module 3032, text input module 3034, and camera module 3043, image management module 3044 includes executable instructions to arrange, modify (e.g., edit), or otherwise manipulate, label, delete, present (e.g., in a digital slide show or album), and store still and/or video images.

In conjunction with RF circuitry 3008, touch screen 3012, display system controller 3056, contact module 3030, graphics module 3032, and text input module 3034, browser module 3047 includes executable instructions to browse the Internet in accordance with user instructions, including searching, linking to, receiving, and displaying web pages or portions thereof, as well as attachments and other files linked to web pages.

In conjunction with RF circuitry 3008, touch screen 3012, display system controller 3056, contact module 3030, graphics module 3032, text input module 3034, e-mail client module 3040, and browser module 3047, calendar module 3048 includes executable instructions to create, display, modify, and store calendars and data associated with calendars (e.g., calendar entries, to do lists, etc.) in accordance with user instructions.

In conjunction with RF circuitry 3008, touch screen 3012, display system controller 3056, contact module 3030, graphics module 3032, text input module 3034, and browser module 3047, widget modules 3049 are mini-applications that may be downloaded and used by a user (e.g., weather widget 3049-1, stocks widget 3049-2, calculator widget 3049-3, alarm clock widget 3049-4, and dictionary widget 3049-5) or created by the user (e.g., user-created widget 3049-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 3008, touch screen 3012, display system controller 3056, contact module 3030, graphics module 3032, text input module 3034, and browser module 3047, the widget creator module 3050 may be used by a user to create widgets (e.g., turning a user-specified portion of a web page into a widget).

In conjunction with touch screen 3012, display system controller 3056, contact module 3030, graphics module 3032, and text input module 3034, search module 3051 includes executable instructions to search for text, music, sound, image, video, and/or other files in memory 3002 that match one or more search criteria (e.g., one or more user-specified search terms) in accordance with user instructions.

In conjunction with touch screen 3012, display system controller 3056, contact module 3030, graphics module 3032, audio circuitry 3010, speaker 3011, RF circuitry 3008, and browser module 3047, video and music player module 3052 includes executable instructions that allow the user to download and play back recorded music and other sound files stored in one or more file formats, such as MP3 or AAC files, and executable instructions to display, present or otherwise play back videos (e.g., on touch screen 3012 or on an external, connected display via external port 3024). In some embodiments, device 3000 may include the functionality of an MP3 player, such as an iPod (trademark of Apple Inc.).

In conjunction with touch screen 3012, display controller 3056, contact module 3030, graphics module 3032, and text input module 3034, notes module 3053 includes executable instructions to create and manage notes, to do lists, and the like in accordance with user instructions.

In conjunction with RF circuitry 3008, touch screen 3012, display system controller 3056, contact module 3030, graphics module 3032, text input module 3034, GPS module 3035, and browser module 3047, map module 3054 may be used to receive, display, modify, and store maps and data associated with maps (e.g., driving directions; data on stores and other points of interest at or near a particular location; and other location-based data) in accordance with user instructions.

In conjunction with touch screen 3012, display system controller 3056, contact module 3030, graphics module 3032, audio circuitry 3010, speaker 3011, RF circuitry 3008, text input module 3034, e-mail client module 3040, and browser module 3047, online video module 3055 includes instructions that allow the user to access, browse, receive (e.g., by streaming and/or download), play back (e.g., on the touch screen or on an external, connected display via external port 3024), send an e-mail with a link to a particular online video, and otherwise manage online videos in one or more file formats, such as H.264. In some embodiments, instant messaging module 3041, rather than e-mail client module 3040, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 3002 may store a subset of the modules and data structures identified above. Furthermore, memory 3002 may store additional modules and data structures not described above.

In some embodiments, device 3000 is a device where operation of a predefined set of functions on the device is performed exclusively through a touch screen and/or a touchpad. By using a touch screen and/or a touchpad as the primary input control device for operation of device 3000, the number of physical input control devices (such as push buttons, dials, and the like) on device 3000 may be reduced.

The predefined set of functions that may be performed exclusively through a touch screen and/or a touchpad include navigation between user interfaces. In some embodiments, the touchpad, when touched by the user, navigates device 3000 to a main, home, or root menu from any user interface that may be displayed on device 3000. In such embodiments, the touchpad may be referred to as a "menu button." In some other embodiments, the menu button may be a physical push button or other physical input control device instead of a touchpad.

Figure 23:
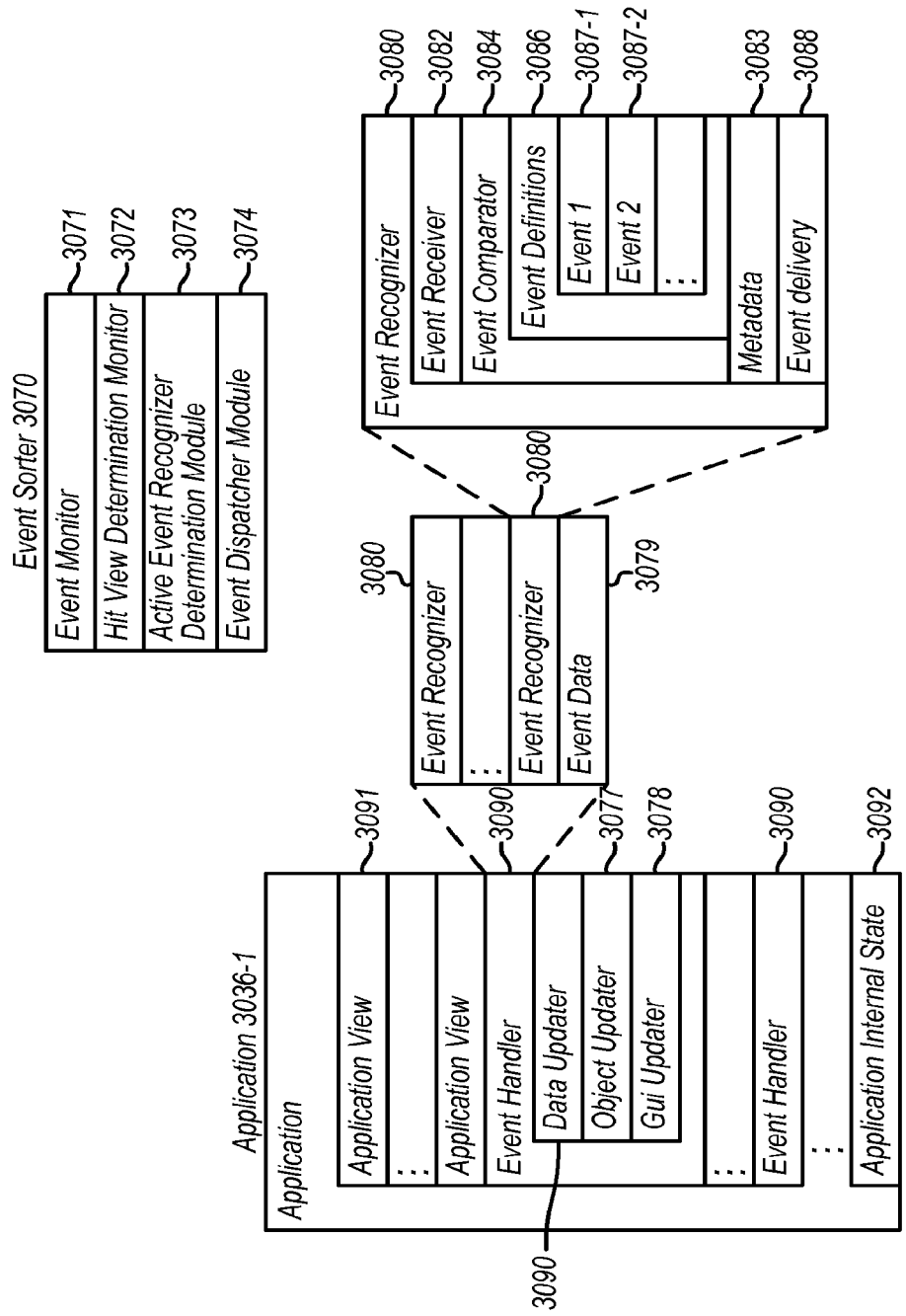

FIG. 23 is a block diagram illustrating exemplary components for event handling in accordance with some embodiments. In some embodiments, memory 3002 (in FIG. 23) includes event sorter 3070 (e.g., in operating system 3026) and a respective application 3036-1 (e.g., any of the aforementioned applications 3037-3051, 3055).

Event sorter 3070 receives event information and determines the application 3036-1 and application view 3091 of application 3036-1 to which to deliver the event information. Event sorter 3070 includes event monitor 3071 and event dispatcher module 3074. In some embodiments, application 3036-1 includes application internal state 3092, which indicates the current application view(s) displayed on touch sensitive display 3012 when the application is active or executing. In some embodiments, device/global internal state 3057 is used by event sorter 3070 to determine which application(s) is (are) currently active, and application internal state 3092 is used by event sorter 3070 to determine application views 3091 to which to deliver event information, such as which applications may control display of data on display 3012 and configure display attributes for video communications, as discussed above with regard to FIGS. 1-10.

In some embodiments, application internal state 3092 includes additional information, such as one or more of: resume information to be used when application 3036-1 resumes execution, user interface state information that indicates information being displayed or that is ready for display by application 3036-1, a state queue for enabling the user to go back to a prior state or view of application 3036-1, and a redo/undo queue of previous actions taken by the user.

Event monitor 3071 receives event information from peripherals interface 3018. Event information includes information about a sub-event (e.g., a user touch on touch sensitive display 3012, as part of a multi-touch gesture). Peripherals interface 3018 transmits information it receives from I/O subsystem 3006 or a sensor, such as proximity sensor 3066, orientation sensor(s) 3068, and/or microphone 3013 (through audio circuitry 3010). Information that peripherals interface 3018 receives from I/O subsystem 3006 includes information from touch-sensitive display 3012 or a touch-sensitive surface.

In some embodiments, event monitor 3071 sends requests to the peripherals interface 3018 at predetermined intervals. In response, peripherals interface 3018 transmits event information. In other embodiments, peripheral interface 3018 transmits event information only when there is a significant event (e.g., receiving an input above a predetermined noise threshold and/or for more than a predetermined duration).

In some embodiments, event sorter 3070 also includes a hit view determination module 3072 and/or an active event recognizer determination module 3073.

Hit view determination module 3072 provides software procedures for determining where a sub-event has taken place within one or more views, when touch sensitive display 3012 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 3072 receives information related to sub-events of a touch-based gesture. When an application has multiple views organized in a hierarchy, hit view determination module 3072 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 3073 determines which view or views within a view hierarchy should receive a particular sequence of sub-events. In some embodiments, active event recognizer determination module 3073 determines that only the hit view should receive a particular sequence of sub-events. In other embodiments, active event recognizer determination module 3073 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 3080). In embodiments including active event recognizer determination module 3073, event dispatcher module 3074 delivers the event information to an event recognizer determined by active event recognizer determination module 3073. In some embodiments, event dispatcher module 3074 stores in an event queue the event information, which is retrieved by a respective event receiver module 3082.

In some embodiments, operating system 3026 includes event sorter 3070. Alternatively, application 3036-1 includes event sorter 3070. In yet other embodiments, event sorter 3070 is a stand-alone module, or a part of another module stored in memory 3002, such as contact/motion module 3030.

In some embodiments, application 3036-1 includes multiple event handlers 3090 and one or more application views 3091, each of which includes instructions for handling touch events that occur within a respective view of the application's user interface. Each application view 3091 of the application 3036-1 includes one or more event recognizers 3080. Typically, a respective application view 3091 includes multiple event recognizers 3080. In other embodiments, one or more of event recognizers 3080 are part of a separate module, such as a user interface kit (not shown) or a higher level object from which application 3036-1 inherits methods and other properties. In some embodiments, a respective event handler 3090 includes one or more of: data updater 3076, object updater 3077, GUI updater 3078, and/or event data 3079 received from event sorter 3070. Event handler 3090 may utilize or call data updater 3076, object updater 3077 or GUI updater 3078 to update the application internal state 3092. Alternatively, one or more of the application views 3091 includes one or more respective event handlers 3090. Also, in some embodiments, one or more of data updater 3076, object updater 3077, and GUI updater 3078 are included in a respective application view 3091.

A respective event recognizer 3080 receives event information (e.g., event data 3079) from event sorter 3070, and identifies an event from the event information. Event recognizer 3080 includes event receiver 3082 and event comparator 3084. In some embodiments, event recognizer 3080 also includes at least a subset of: metadata 3083, and event delivery instructions 3088 (which may include sub-event delivery instructions).

Event receiver 3082 receives event information from event sorter 3070. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 3084 compares the event information to predefined event or sub-event definitions and, based on the comparison, determines an event or sub-event, or determines or updates the state of an event or sub-event. In some embodiments, event comparator 3084 includes event definitions 3086. Event definitions 3086 contain definitions of events (e.g., predefined sequences of sub-events), for example, event 1 (3087-1), event 2 (3087-2), and others. In some embodiments, sub-events in an event 3087 include, for example, touch begin, touch end, touch movement, touch cancellation, and multiple touching. In one example, the definition for event 1 (3087-1) is a double tap on a displayed object. The double tap, for example, includes a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (1087-2) is a dragging on a displayed object. The dragging, for example, includes a touch (or contact) on the displayed object for a predetermined phase, a movement of the touch across touch-sensitive display 3012, and lift-off of the touch (touch end). In some embodiments, the event also includes information for one or more associated event handlers 3090.

In some embodiments, event definition 3087 includes a definition of an event for a respective user-interface object. In some embodiments, event comparator 3084 performs a hit test to determine which user-interface object is associated with a sub-event. For example, in an application view in which three user-interface objects are displayed on touch-sensitive display 3012, when a touch is detected on touch-sensitive display 3012, event comparator 3084 performs a hit test to determine which of the three user-interface objects is associated with the touch (sub-event). If each displayed object is associated with a respective event handler 3090, the event comparator uses the result of the hit test to determine which event handler 3090 should be activated. For example, event comparator 3084 selects an event handler associated with the sub-event and the object triggering the hit test.

In some embodiments, the definition for a respective event 3087 also includes delayed actions that delay delivery of the event information until after it has been determined whether the sequence of sub-events does or does not correspond to the event recognizer's event type.

When a respective event recognizer 3080 determines that the series of sub-events do not match any of the events in event definitions 3086, the respective event recognizer 3080 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 3080 includes metadata 3083 with configurable properties, flags, and/or lists that indicate how the event delivery system should perform sub-event delivery to actively involved event recognizers. In some embodiments, metadata 3083 includes configurable properties, flags, and/or lists that indicate how event recognizers may interact with one another. In some embodiments, metadata 3083 includes configurable properties, flags, and/or lists that indicate whether sub-events are delivered to varying levels in the view or programmatic hierarchy.

In some embodiments, a respective event recognizer 3080 activates event handler 3090 associated with an event when one or more particular sub-events of an event are recognized. In some embodiments, a respective event recognizer 3080 delivers event information associated with the event to event handler 3090. Activating an event handler 3090 is distinct from sending (and deferred sending) sub-events to a respective hit view. In some embodiments, event recognizer 3080 throws a flag associated with the recognized event, and event handler 3090 associated with the flag catches the flag and performs a predefined process.

In some embodiments, event delivery instructions 3088 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 3076 creates and updates data used in application 3036-1. For example, data updater 3076 updates the telephone number used in contacts module 3037, or stores a video file used in video player module 3045. In some embodiments, object updater 3077 creates and updates objects used in application 3036-1. For example, object updater 3076 creates a new user-interface object or updates the position of a user-interface object. GUI updater 3078 updates the GUI. For example, GUI updater 3078 prepares display information and sends it to graphics module 3032 for display on a touch-sensitive display.

In some embodiments, event handler(s) 3090 includes or has access to data updater 3076, object updater 3077, and GUI updater 3078. In some embodiments, data updater 3076, object updater 3077, and GUI updater 3078 are included in a single module of a respective application 3036-1 or application view 3091. In other embodiments, they are included in two or more software modules.

It shall be understood that the foregoing discussion regarding event handling of user touches on touch-sensitive displays also applies to other forms of user inputs to operate multifunction devices 3000 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 24:
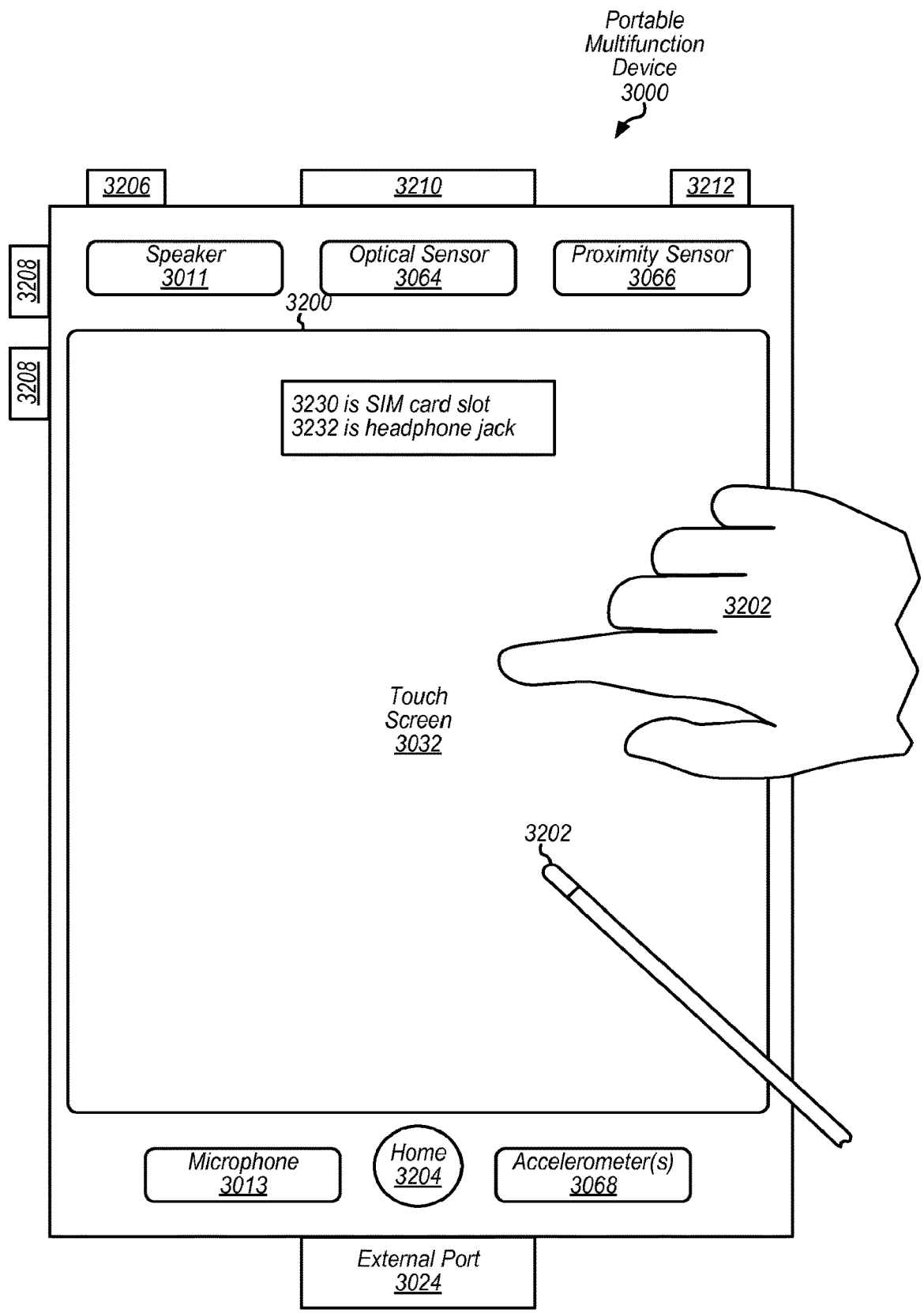

FIG. 24 illustrates a portable multifunction device 3000 having a touch screen 3012 in accordance with some embodiments. The touch screen may display one or more graphics within user interface (UI) 3200. In this embodiment, as well as others described below, a user may select one or more of the graphics by making a gesture on the graphics, for example, with one or more fingers 3202 (not drawn to scale in the figure) or one or more styluses 3203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 3000. In some embodiments, inadvertent contact with a graphic may not select the graphic. For example, a swipe gesture that sweeps over an application icon may not select the corresponding application when the gesture corresponding to selection is a tap.

Device 3000 may also include one or more physical buttons, such as "home" or menu button 3204. As described previously, menu button 3204 may be used to navigate to any application 3036 in a set of applications that may be executed on device 3000. Alternatively, in some embodiments, the menu button is implemented as a soft key in a GUI displayed on touch screen 3012.

In one embodiment, device 3000 includes touch screen 3012, menu button 3204, push button 3206 for powering the device on/off and locking the device, volume adjustment button(s) 3208, Subscriber Identity Module (SIM) card slot 3210, head set jack 3212, and docking/charging external port 3024. Push button 3206 may be used to turn the power on/off on the device by depressing the button and holding the button in the depressed state for a predefined time interval; to lock the device by depressing the button and releasing the button before the predefined time interval has elapsed;

and/or to unlock the device or initiate an unlock process. In an alternative embodiment, device 3000 also may accept verbal input for activation or deactivation of some functions through microphone 3013.

It should be noted that, although many of the following examples will be given with reference to inputs on touch screen 3012 (where the touch sensitive surface and the display are combined), a touch-sensitive surface that is separate from the display may be used instead of touch screen 3012.

Figure 25:
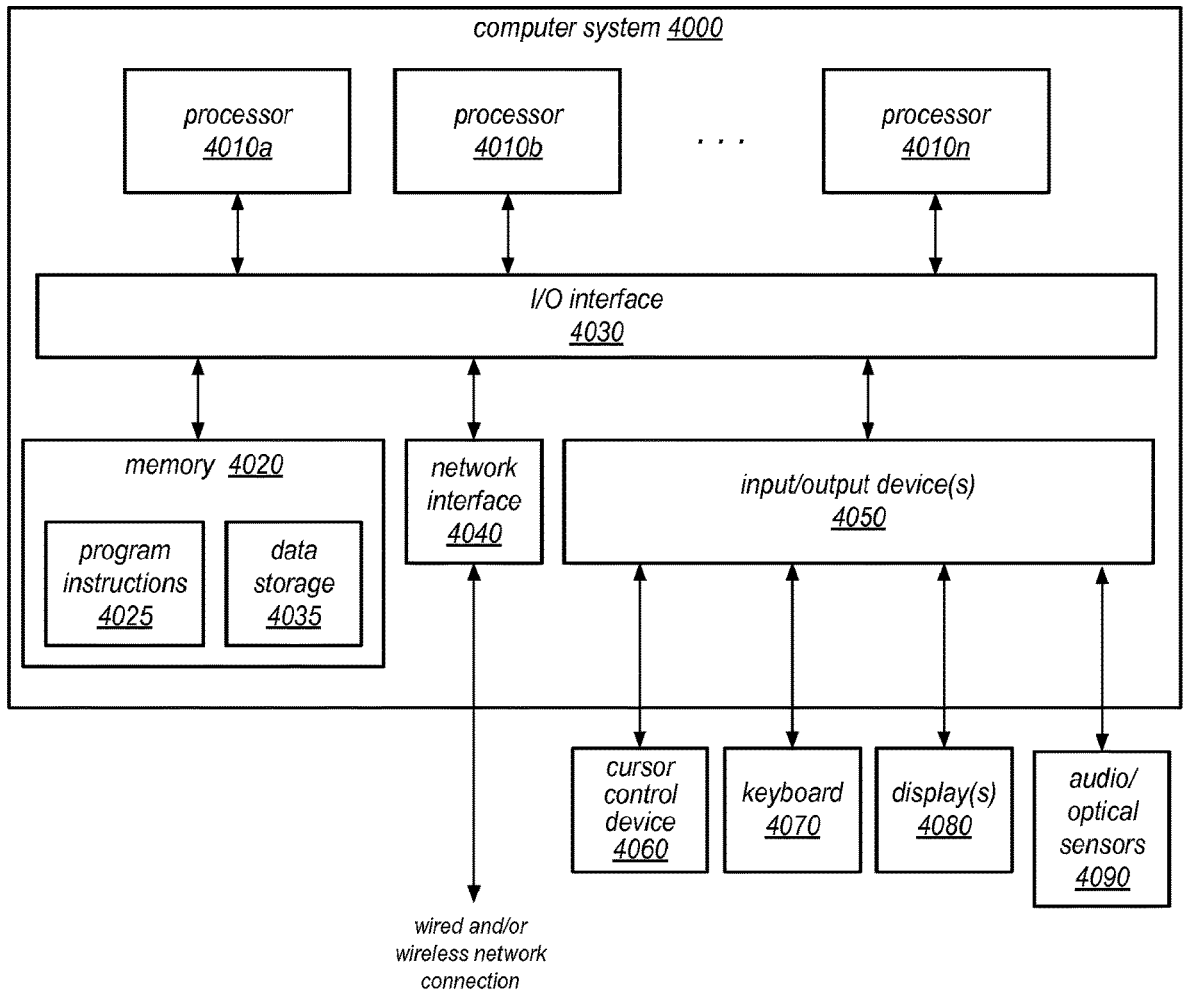
FIG. 25 illustrates an example computing system according to some embodiments.

Embodiments of the various methods and techniques for video communication as described herein may be executed on one or more computer systems which may interact with various other participant devices, such as portable multi-function computing device 3000 described above with regard to FIGS. 22-24. One such computer system is illustrated by FIG. 25. In different embodiments, computer system 4000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 4000 includes one or more processors 4030 coupled to a system memory 4020 via an input/output (I/O) interface 4030. Computer system 4000 further includes a network interface 4040 coupled to I/O interface 4030, and one or more input/output devices 4050, such as cursor control device 4060, keyboard 4070, display(s) 4080, as well as various audio/optical sensors 4090 for capturing video and audio data. In some embodiments, it is contemplated that embodiments may be implemented using a single instance of computer system 4000, while in other embodiments multiple such systems, or multiple nodes making up computer system 4000, may be configured to host different portions or instances of embodiments.

In various embodiments, computer system 4000 may be a uniprocessor system including one processor 4010, or a multiprocessor system including several processors 4010 (e.g., two, four, eight, or another suitable number). Processors 4010 may be any suitable processor capable of executing instructions. For example, in various embodiments, processors 4010 may be general-purpose or embedded processors implementing any of a variety of instruction set architectures (ISAs), such as the x86, PowerPC, SPARC, or MIPS ISAs, or any other suitable ISA. In multiprocessor systems, each of processors 4010 may commonly, but not necessarily, implement the same ISA.

In some embodiments, at least one processor 4010 may be a graphics processing unit. A graphics processing unit or GPU may be considered a dedicated graphics-client device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 4020 may be configured to store program instructions and/or data accessible by processor 4010. In various embodiments, system memory 4020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for video communications as described herein are shown stored within system memory 4020 as program instructions 4025 and data storage 4035, respectively. In other embodiments, program instructions and/or data may be received, sent or stored upon different types of computer-accessible media or on similar media separate from system memory 4020 or computer system 4000. Generally speaking, a computer-accessible medium may include storage media or memory media such as magnetic or optical media, e.g., disk or CD/DVD-ROM coupled to computer system 4000 via I/O interface 4030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 4040.

In one embodiment, I/O interface 4030 may be configured to coordinate I/O traffic between processor 4010, system memory 4020, and any peripheral devices in the device, including network interface 4040 or other peripheral interfaces, such as input/output devices 4050. In some embodiments, I/O interface 4030 may perform any necessary protocol, timing or other data transformations to convert data signals from one component (e.g., system memory 4020) into a format suitable for use by another component (e.g., processor 4010). In some embodiments, I/O interface 4030 may include support for devices attached through various types of peripheral buses, such as a variant of the Peripheral Component Interconnect (PCI) bus standard or the Universal Serial Bus (USB) standard, for example. In some embodiments, the function of I/O interface 4030 may be split into two or more separate components, such as a north bridge and a south bridge, for example. In addition, in some embodiments some or all of the functionality of I/O interface 4030, such as an interface to system memory 4020, may be incorporated directly into processor 4010.

Network interface 4040 may be configured to allow data to be exchanged between computer system 4000 and other devices attached to a network, such as other computer systems, or between nodes of computer system 4000. In various embodiments, network interface 4040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 4050 may, in some embodiments, include one or more display terminals, keyboards, keypads, touchpads, scanning devices, voice or optical recognition devices, or any other devices suitable for entering or retrieving data by one or more computer system 4000. Multiple input/output devices 4050 may be present in computer system 4000 or may be distributed on various nodes of computer system 4000. In some embodiments, similar input/output devices may be separate from computer system 4000 and may interact with one or more nodes of computer system 4000 through a wired or wireless connection, such as over network interface 4040.

As shown in FIG. 25, memory 4020 may include program instructions 4025, configured to implement embodiments of the video communication techniques as described herein, and data storage 4035, comprising various data accessible by program instructions 4025. Data storage 4035 may include data that may be used in embodiments. In other embodiments, other or different software elements and data may be included.

Those skilled in the art will appreciate that computer system 4000 is merely illustrative and is not intended to limit the scope of the methods and techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 4000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 4000 may be transmitted to computer system 4000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

In the previous detailed description, numerous specific details are set forth to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the detailed description herein is for the purpose of describing particular embodiments only and is not intended to be limiting of the invention. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Some portions of the detailed description which follow are presented in terms of algorithms or symbolic representation of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software and other programmable electronic devices. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels.

What is claimed is:

1. A system, comprising:
   a display;
   one or more processors;
   a memory comprising program instructions that when executed by the one or more processors cause the one or more processors to:
     display video communication data of an active video communication received by a video communication application which controls the display in a full screen mode;
     detect a launch of a different application to be displayed via the display, wherein the launch comprises a change in control of the display to the different application from the video communication application; and
     responsive to the detection of the launch of the different application, display subsequent video communication data of the active video communication received by the video communication application at one or more locations corresponding to different respective portions of the display determined by the different application controlling the display and based on user input.

2. The system of claim 1, wherein the program instructions when executed by the one or more processors further cause the at least one processor to:
   responsive to detection of a change in orientation of the display, change the display of the subsequently received video communication at the one or more determined locations corresponding to the change in orientation.

3. The system of claim 1, wherein the video communication data comprises image data received for two or more participants from two or more remote computing devices.

4. The system of claim 1, wherein to display the subsequent video communication data of the active video communication received by the video communication application at the one or more determined locations, the program instructions cause the one or more processors to integrate the video communication data with other data displayed for the different application.

5. The system of claim 1, wherein the program instructions when executed by the one or more processors further cause the at least one processor to:
   responsive to a detection of a change in control of the display back to the video communication application from the different application, display further video communication data of the active communication received by the video communication application in the full screen mode of the display.

6. The system of claim 1, wherein the system is a mobile phone.

7. A method, comprising:
   displaying, at a mobile device, received video communication data of an active video communication in a full screen mode of a display controlled by a video communication application;
   detecting, by the mobile device, a change in control of the display to a different application from the video communication application; and
   responsive to the detection of the change in control of the display to the different application, displaying, by the mobile device, subsequently received video communication data of the active video communication at one or more locations corresponding to different respective portions of the display determined by the different application controlling the display and based on user input.

8. The method of claim 7, further comprising:
   responsive to detecting a change in orientation of the mobile device, changing, by the mobile device, the display of the subsequently received video communication at the one or more determined locations corresponding to the change in orientation.

9. The method of claim 7, wherein the video communication data comprises image data received for two or more participants from two or more remote computing devices.

10. The method of claim 7, wherein displaying the subsequently received video communication data of the active video communication at the one or more determined locations comprises changing the display of the video communication data from a first one of the one or more determined locations to a second one of the one or more determined locations.

11. The method of claim 7, wherein displaying the subsequently received video communication data of the active video communication at the one or more determined locations comprises allowing the different application to integrate the video communication data with other data displayed for the different application.

12. The method of claim 7, further comprising:
    responsive to a detection of a change in control of the display back to the video communication application from the different application, displaying, by the mobile device, further received video communication data of the active communication in the full screen mode of the display.

13. The method of claim 7, wherein the display is a touch screen display and wherein the user input is touch input to the touch screen display.

14. A non-transitory, computer-readable storage medium, storing program instructions that when executed by a portable multi-function device causes the portable multi-function device to implement:
    displaying received video communication data of an active video communication in a full screen mode of a display controlled by a video communication application; and
    responsive to a user input to launch a window corresponding to a different application that controls the display instead of the video communication application, displaying subsequently received video communication data of the active video communication at one or more determined locations corresponding to different respective portions of the display determined by the different application controlling the display and based on user input.

15. The non-transitory, computer-readable storage medium of claim 14, wherein the program instructions when executed by the portable multi-function device cause the portable multi-function device to further implement:
    responsive to detecting a change in orientation of the display, changing the display of the subsequently received video communication at the one or more determined locations corresponding to the change in orientation.

16. The non-transitory, computer-readable storage medium of claim 14, wherein the video communication data comprises image data received for two or more participants from two or more remote computing devices.

17. The non-transitory, computer-readable storage medium of claim 14, wherein, in displaying the subsequently received video communication data of the active video communication at the one or more determined locations, the program instructions when executed by the portable multi-function device cause the portable multi-function device to implement changing the display of the video communication data from a first one of the one or more determined locations to a second one of the one or more determined locations.

18. The non-transitory, computer-readable storage medium of claim 14, wherein, in displaying the subsequently received video communication data of the active video communication at the one or more determined locations, the program instructions when executed by the portable multi-function device cause the portable multi-function device to implement allowing the different application to integrate the video communication data with other data displayed for the different application.

19. The non-transitory, computer-readable storage medium of claim 14, wherein the program instructions when executed by the portable multi-function device cause the portable multi-function device to further implement:
   responsive to a detection of a change in control of the display back to the video communication application from the different application, displaying further received video communication data of the active communication in the full screen mode of the display.

20. The non-transitory, computer-readable storage medium of claim 14, wherein the display is a touch screen display and wherein the user input is touch input to the touch screen display.

\* \* \* \* \*